US012510227B2

(12) United States Patent
Spiro

(10) Patent No.: US 12,510,227 B2
(45) Date of Patent: Dec. 30, 2025

(54) ORIENTATION SPECIFIC OPTICS

(71) Applicant: Exposure IP LLC, Scottsdale, AZ (US)

(72) Inventor: Daniel S. Spiro, Scottsdale, AZ (US)

(73) Assignee: EXPOSURE IP LLC, Scottsdale, AZ (US)

( * ) Notice: Subject to any disclaimer, the term of this patent is extended or adjusted under 35 U.S.C. 154(b) by 0 days.

(21) Appl. No.: 19/045,541

(22) Filed: Feb. 4, 2025

(65) Prior Publication Data

US 2025/0180186 A1 Jun. 5, 2025

Related U.S. Application Data

(63) Continuation-in-part of application No. 18/798,429, filed on Aug. 8, 2024, now Pat. No. 12,247,730, which is a continuation-in-part of application No. 18/436,081, filed on Feb. 8, 2024, now Pat. No. 12,085,274, which is a continuation-in-part of application No. 18/401,448, filed on Dec. 30, 2023, now Pat. No. 12,038,170, which is a continuation-in-part of application No. 18/381,231, filed on Oct. 18, 2023, now Pat. No. 11,901,718.

(60) Provisional application No. 63/548,311, filed on Nov. 13, 2023.

(51) Int. Cl.
*F21V 5/08* (2006.01)
*F21S 8/04* (2006.01)
*F21V 5/00* (2018.01)

(52) U.S. Cl.
CPC *F21V 5/08* (2013.01); *F21S 8/04* (2013.01); *F21V 5/007* (2013.01)

(58) Field of Classification Search
CPC ............... F21V 5/08; F21V 5/007; F21S 8/04
See application file for complete search history.

(56) References Cited

U.S. PATENT DOCUMENTS

| | | | | |
|---|---|---|---|---|
| 6,210,018 | B1 * | 4/2001 | Kassay | F21V 15/01 362/225 |
| 10,323,824 | B1 * | 6/2019 | Lim | F21V 5/02 |
| 2010/0270933 | A1 * | 10/2010 | Chemel | H05B 47/155 315/130 |
| 2010/0296285 | A1 * | 11/2010 | Chemel | H05B 47/11 362/249.1 |
| 2012/0307503 | A1 * | 12/2012 | Wilcox | F21V 13/02 362/308 |
| 2014/0376220 | A1 | 12/2014 | Shen et al. | |
| 2016/0348855 | A1 * | 12/2016 | Zampini | G02B 19/0014 |
| 2017/0175953 | A1 * | 6/2017 | Van Boven | F21K 9/65 |
| 2017/0257925 | A1 * | 9/2017 | Forbis | H05B 45/20 |
| 2018/0231200 | A1 * | 8/2018 | Hierzer | F21V 29/83 |
| 2018/0292071 | A1 * | 10/2018 | Tarsa | F21V 5/08 |
| 2019/0338917 | A1 | 11/2019 | Chen et al. | |

FOREIGN PATENT DOCUMENTS

WO 2021/046108 A1 3/2021

OTHER PUBLICATIONS

International Search Report and Written Opinion mailed on Mar. 21, 2025, in corresponding PCT/IB2024/061185, 22 pages.

* cited by examiner

*Primary Examiner* — Bryon T Gyllstrom
(74) *Attorney, Agent, or Firm* — XSENSUS LLP

(57) ABSTRACT

An optical lens structure with an arrangement comprising at least two directional precision lensed optics configured to illuminate a surface coupled to a luminaire and at least one of a horizontal and a vertical surface below the luminaire.

23 Claims, 13 Drawing Sheets

ORIENTATION SPECIFIC OPTICS

CROSS-REFERENCE TO RELATED APPLICATIONS

The present application is a continuation-in-part of U.S. patent application Ser. No. 18/798,429, filed 8 Aug. 2024, which is a continuation-in-part of U.S. patent application Ser. No. 18/436,081, filed 8 Feb. 2024 (now U.S. Pat. No. 12,085,274), which is a continuation-in-part of U.S. patent application Ser. No. 18/401,448, filed 30 Dec. 2023 (now U.S. Pat. No. 12,038,170), which is a continuation-in-part of U.S. patent application Ser. No. 18/381,231, filed 18 Oct. 2023 (now U.S. Pat. No. 11,901,718), and claims the benefit of the earlier filing date of U.S. Provisional Application No. 63/548,311, filed 13 Nov. 2023. This application has common inventorship with, and contains subject matter related to that disclosed in U.S. patent application Ser. No. 18/113,098, filed 23 Feb. 2023 (now U.S. Pat. No. 11,788,692), as well as U.S. patent application Ser. No. 18/433,140, filed 5 Feb. 2024, and U.S. patent application Ser. No. 18/406,136, filed 6 Jan. 2024, both of which are continuations-in-part of U.S. patent application Ser. No. 18/381,231, filed 18 Oct. 2023 (now U.S. Pat. No. 11,901,718), the entire contents of each of the above disclosures are being incorporated herein by reference.

BACKGROUND

Technical Field

The present disclosure relates to luminaires, and more particularly luminaires that illuminate vertical and horizontal surfaces.

Discussion of Background

Low and high bay luminaires are often mounted at mounting heights that typically range between 15 feet and 50 feet above a finished floor. Today, the most common luminaire light source is based on a set of light emitting diodes (LEDs). The LED light source is planar and hosts an array of individual LEDs, with the light emitted from this planar LED light source directed toward the floor below. The luminaire is typically suspended from a structure above by cables, chains, or a conduit.

As discussed in U.S. patent application Ser. No. 18/401,448 (See FIG. 1*a* and FIG. 1*b* therein) inefficiencies exist with present-day vertical illumination provided by low and highbay luminaires when mounted above an elongated space such as a racked aisle. FIG. 1*a* of U.S. patent application Ser. No. 18/401,448 is for one main brand highbay luminaire, and FIG. 1*b* of U.S. patent application Ser. No. 18/401,448 is for another main brand luminaire. The racked aisle is an elongated space with at least one vertical surface, and the figures are shown from the perspective of facing the one vertical surface, with a person walking in an aisleway which runs from left to right in the figures. Two luminaires are shown suspended above the racked aisle spaced apart by a distance. The luminaire's height from the floor is H1, and H2 is the top edge of the vertical surface of the rack illuminated by the luminaires. These figures show that the highest vertical light levels emitted by the luminaire across the face of the vertical plane occurs well above an adult human eye level, contrary to where it should be. A band of higher light intensity should extend above and below the adult human eye level, in a range, along the length of the face of the vertical surface. Herein, the range is an inclusive range of 3' above the finished floor 1 to 7' above the finished floor 1—this range of 3' to 7' is sometimes referred to herein as "the inclusive range" and is intended to cover a height above finished floor of the aisleway on the vertical surface that defines one side of the aisleway, the vertical surface usually being racks of goods, or a wall. A portion of the energy (region 6*a*) associated with the exceedingly intense light levels is wasteful. Further, the human eye is configured to home in on well-lit surfaces. As a result, surfaces within the range in these figures is relatively dim.

These figures also show a poor vertical uniformity ratio between maximum light levels that occur in a region in which light levels exceed 60% of a target, and minimum light levels in a region in which light is below 60% of a target. Most striking is the relatively short distance between an intense light level surface and a dim lit surface nearby. According to the IESNA guidebook for indoor illumination, an acceptable ratio between maximum to minimum light levels is 3:1. The present figures exceed this ratio as is evident from light levels seen in Tables 1 and 2, as will be discussed below.

Tables 1 and 2 show light levels, in foot candles, on 2.5'×4' (height×length) subregions of a vertical surface of respective conventional lighting systems over aisleways. In these examples, the height of the vertical surface is 22.5' although a similar distribution is present for higher vertical surfaces. In each of Tables 1 and 2 eye level is just above the second row from the bottom. As can be seen, while the light levels at eye levels are around 30 to 32 foot candles, subregions above eye level far exceed the light levels at eye level, with some subregions reaching over 100 foot candles. In the case of Example 1 (Table 1), the peak light intensity is not near eye level, where the goods for sale are often located, but well above eye level, around 17.5'. Thus, significant energy is wasted illuminating less interesting portions of the vertical surface, and the unnecessarily high light intensities gives rise to more glare than desirable for the consumer walking in the aisleway. In the case of Example 2 (Table 2) the luminaires are tilted toward the vertical surface, and have lower output candle power. These combine to lower the peak level to about 15' above the floor ($6^{th}$ row from the bottom), but also cause a much larger region of lower light intensity toward the top of the vertical surface (see the top three rows) as well as create "hot spots" (light exceeding 60% of target) on the vertical surface with large bright subregions compared to surrounding dim subregions: compare the bright subregions at the $3^{rd}$ and $4^{th}$ rows from the top and in the $3^{rd}/4^{th}$ columns (first bright subregions with illumination levels as high as 92 foot candles), and $7^{th}/8^{th}$ columns (second bright subregions with illumination levels as high as 96 foot candles) as compared to adjacent dim subregion (light levels below 60% of target) such as at the $3^{rd}$ row from the top and $5^{th}/6^{th}$ columns (20 and 14 foot candles). Furthermore, in example 2 (Table 2) the upper portion of the vertical surface (see the top two rows) are dimly illuminated. This variation in illumination level is highly disparate with hot spot subregions at 96 foot candles, and dim subregions in the single digits. As with the case of example 1 (Table 1), the peak light intensity is well above eye level. Thus merely tilting the luminaire toward the vertical surface, and adjusting the output levels of adjacent luminaires does not provide the ideal illumination pattern on the vertical surface of an elongated space, and the does not create a peak illumination at eye level.

TABLE 1

Example 1, Light Levels (foot candles) in subregions
2.5' × 4' subregions of vertical surface

| | | | | | | | | | |
|---|---|---|---|---|---|---|---|---|---|
| 11 | 13 | 17 | 15 | 12 | 12 | 15 | 17 | 14 | 12 |
| 41 | 67 | 107 | 88 | 49 | 45 | 81 | 109 | 72 | 42 |
| 56 | 70 | 95 | 84 | 61 | 59 | 79 | 97 | 75 | 57 |
| 51 | 63 | 77 | 71 | 55 | 53 | 69 | 77 | 65 | 52 |
| 46 | 49 | 51 | 50 | 48 | 48 | 50 | 51 | 49 | 46 |
| 39 | 38 | 38 | 38 | 38 | 39 | 38 | 38 | 38 | 39 |
| 31 | 31 | 30 | 31 | 31 | 31 | 31 | 31 | 31 | 31 |
| 26 | 27 | 27 | 27 | 26 | 26 | 27 | 27 | 27 | 26 |

TABLE 2

Example 2, Light Levels (foot candles) in subregions
2.5' × 4' subregions of vertical surface

| | | | | | | | | | |
|---|---|---|---|---|---|---|---|---|---|
| 8 | 9 | 10 | 10 | 8 | 8 | 9 | 10 | 9 | 8 |
| 11 | 12 | 16 | 14 | 11 | 11 | 13 | 16 | 13 | 11 |
| 12 | 36 | 92 | 74 | 20 | 14 | 59 | 96 | 53 | 13 |
| 45 | 56 | 68 | 64 | 49 | 47 | 62 | 68 | 59 | 45 |
| 48 | 46 | 45 | 45 | 47 | 48 | 45 | 45 | 45 | 48 |
| 37 | 37 | 37 | 37 | 37 | 37 | 37 | 37 | 38 | 37 |
| 30 | 30 | 32 | 32 | 30 | 30 | 31 | 32 | 31 | 30 |
| 27 | 27 | 28 | 28 | 27 | 27 | 27 | 28 | 27 | 27 |

Technical Problems

As recognized by the present inventor, a deficiency of present-day luminaires installed in elongated spaces (such as over aisleways) is that the emitted light forms "hot spots" over the vertical surfaces that define the elongated space. The light emitted is cast on surfaces well above eye level for an adult human, and thus is not distributed in an efficient manner. Furthermore, another issue of ceiling-supported luminaires is their respective spacing because ineffective spacing often results in uncomfortable glare as experienced by occupants in the aisleway.

In view of the above, there are four primary constraints that architects, engineers, and lighting designers face when designing the illumination of elongated spaces with low and high bay luminaires. These constraints include:

1. Luminaire selection is decided based on light dispersion patterns dictated by the luminaire's form, thus limiting the selection of luminaire/s due to their form.
2. More than one mounting point to a support structure is required for most luminaires.
3. Inability to illuminate horizontal and vertical surfaces with a high degree of uniformity, regardless of the luminaire's form.
4. The most intense light falls on a portion of a vertical surface that is well above an adult human's eye level, and with some applications a portion of the light emitted is perceived as direct glare.

Solutions

According to one non-limiting aspect of the present disclosure, the present innovation solves the luminaire form driven optical constraints by introducing orientation specific optical lens/es over the LED light source/s. The use of orientation specific optics can be comprised in conjunction with at least one of, a mechanical orientation mounting device and a heat dissipating structure with coupled light sources and optical lens/es configured to rotate horizontally about a driver housing.

Consistent with the prior applications, the present application describes and shows an orientation specific luminaire suspended from a support structure adjacent to at least one vertical surface. The orientation specific luminaire comprises a housing that supports a lamp, the housing including a downward facing side that faces a floor of an elongated space, and has a predetermined orientation set in relation to at least one of a longitudinal axis of the elongated space and the first vertical surface that defines a first side of the elongated space. The elongated space described herein is referred to as the aisle.

A lamp comprising a plurality of light sources that are distributed across the planar structure is covered by at least one lens, and the lens disposed over the plurality of light sources directs the light emitted from the plurality of light sources to provide directional light that illuminates a plurality of vertical subfields distributed along the first vertical surface and across a plurality of horizontal illuminated subfields distributed along at least one of the floors of the aisle and a specified height above the floor of the aisle.

The first vertical surface includes an inclusionary range subfield that extends at least a portion of the length of an aisle. The inclusionary range subfield can be defined as a longitudinal area with a vertical midpoint that can be located 2'-0" above and 2'-0" below the average adult human eye level. In the present application, an adult human eye level is defined as 5'-0" as vertically measured on a surface of the first vertical surface above an aisle floor. While the vertical height of the midpoint of the inclusionary range subfield above the surface the aisle floor can remain at or in the proximity to the 5'-0" adult human eye level mark.

The height of the bottom and/or the top boundaries of the inclusionary range subfield from the aisle floor can vary. The height of the inclusionary range boundaries from the aisle's floor can be defined as the distance an adult human cone of vision extends up and down from an adult human facing a first vertical surface of an aisle, wherein the adult human eyes are perpendicular to the first vertical surface. The 2'-0" top and bottom range boundaries are common to racked merchandising displays.

The orientation specific luminaire is configured to support a lamp with at least one of symmetrical and asymmetrical lensed optics. The lamp coupled to the down facing side that faces the floor can provide space ambient illumination. In addition, at least one second lamp can be oriented in the opposite direction to the downward facing lamp. The second lamp, while also providing ambient illumination, can be configured to illuminate at least one surface above the luminaire. The second lamp can be disposed above the down facing lamp that illuminates at least one of a floor and a floor and at least one first surface.

The orientation specific luminaire can also be configured to support at least one egress lamp emitting at least one of a linear light emittance pattern. The egress lamp can be supported by the downward facing side of the housing. At least one egress lamp coupled to the downward facing side of the housing can rotate about its vertical axis. The central longitudinal axis of the linear light emittance pattern of the egress lamp emitted light is configured to align with a longitudinal central axis of a path of egress below the orientation specific luminaire.

Both the ambient lighting lamp and the egress lighting lamp can be controlled. The control of these light sources and their associated electronic devices can be by wire and/or wirelessly. At least one device coupled to an orientation specific luminaire can have a unique digital address. At least one wireless communication device can provide point to point or mashed network connectivity. A microprocessor with code coupled to at least one of the ambient lighting lamp and the egress lighting lamp can be configured to perform at least one of monitoring, testing, reporting, and alerting a remote client about the operational condition of an ambient and/or egress lighting lamp.

Prior orientation specific luminaire applications of the present family described advances in optical lens design that enable directing light to subfields where needed at the right illumination intensity. The applications also described several benefits associated with incorporating novel egress lamp technology with an ambient lighting orientation specific luminaire. The present application expands on novel illumination ratios that contribute to reducing power consumption while improving visual acuity and other utilities resulting from incorporating egress illumination with ambient illumination in one orientation specific luminaire.

Other solutions are provided throughout the detailed description that follows.

SUMMARY

According to an aspect of the present disclosure, an orientation specific lensed optics disposed over a light source of a luminaire illuminates vertical and horizontal surfaces regardless of the luminaire form. The luminaire is coupled to a mounting device and the mounting device is free to rotate about its vertical axis to align the luminaire with other like luminaires and/or room geometry while the mounting device is coupled to a structure above by a single point of attachment.

The Orientation Specific Luminaire—Illuminating elongated spaces such as narrow walkways with adjacent high vertical surface/s is known to be difficult. The orientation specific luminaire is designed to overcome this illumination difficulty. The orientation specific luminaire is coupled to a plurality of lenses. The luminaires lenses' optical design enables illuminating surfaces within elongated spaces no matter the space geometry.

Within the elongated space, mounting the orientation specific luminaire coupled to the lensed optics requires orienting the luminaire in relation to at least one vertical surface. The orientation of the luminaire can take place when a luminaire light source is electrified or unelectrified.

Orienting the luminaire can be done by directly coupling the luminaire to a support structure with optimal mounting orientation or by employing an intermediate orientation device/s. The intermediate orientation device/s can be coupled to the luminaire's support structure and/or to the luminaire.

The Luminaire's Light Source—The luminaire's light source can include a plurality of planar LED lamps that couple to a retaining surface. The retaining surface can be a planar board or a luminaire planar surface that faces the floor below. Most commonly, the planar board with a plurality of LED lamps is configured to couple the luminaire's planar surface that faces the floor below.

The plurality of the coupled lamps is arranged on at least one planar surface in substantially the same orientation. The lamps arranged on the retaining planar surface can be configured in at least one of, a concentric and an orthogonal fashion. The retaining planar surface can be square, round, rectangular, or any irregular form. The lamps' size, form, luminosity, chromaticity, color temperature, and input power can be substantially the same. In at least one embodiment, a lamp/s with at least one different property and/or functionality can couple to the retaining planar surface.

The Luminaire's Lensed Optics—At least two optical lenses can be placed over at least two lamps that are coupled to a planar lamp retaining surface. As will be discussed herein, the lenses can have 3D structure the produce pre-configured optical light emittance properties. The lenses can be configured as a stand-alone structure that is placed over a single LED lamp, or as a structure that can include a plurality of lenses that are dedicated to and placed over a plurality of LED lamps. The latter structure can be shaped to complement the form of the lamp retaining planar surface.

All or the plurality of the floor facing orientation specific luminaire's lenses can employ substantially the same optics above the same plurality of lamps. The light emittance pattern of the lenses is configured to illuminate at least one vertical surface and one horizontal surface below. The illuminance light level intensity over any one surface within the elongated space is determined by the number of lamps coupled to the planar retaining surface with dedicated lenses above.

The lenses are configured to direct the lamp's light in a specific light emittance pattern. In an elongated space, the horizontal light transmittance pattern is generally rectangular, wherein the central longitudinal axis of the generated pattern typically coincides with the central longitudinal axis of an aisle or a corridor.

The intensity of the light emitted through the plurality of lenses can be directed toward different regions of the elongated space surfaces. Typically, the light level and illumination uniformity ratio for an elongated walkway surface, disregarding power consumption efficacy, can be accomplished rather easily. Not so for vertical illuminance.

The average adult human eye level is approximately 5'-0" above floor. The eyes of a person looking forward in an elongated space land on vertical surfaces that are approximately 30° above and below the person's eye. Hence, the illuminance of the vertical surface/s 2'-0" above and below the human eye must be higher than other illuminance levels on the same vertical surface beyond the stated range.

Furthermore, it has been established among persons trained in the art of illumination that high light emittance angles exceeding 45° from a luminaire nadir constitute offensive glare angle. The person traversing an elongated space subject to high glare angles will experience visual discomfort and compromised visual acuity. The present innovation lens design is configured to include directing a lamp light where needed at the specified intensity and reducing or eliminating luminaire emitted offensive glare angles in an elongated space.

The present application describes an orientation specific luminaire with coupled lensed optics that can deliver a prescribed light level intensity where needed and predetermined prescribed uniformity ratios within a surface and between surfaces within an elongated space while increasing spacing between like luminaires, reducing luminaire energy consumption, and reducing apparent glare.

In applications described in the CROSS-REFERENCE TO RELATED APPLICATIONS section of this application, at least some of the documents described a planar light source coupled to a bottom surface of an orientation specific luminaire. Prior related innovations included orientation specific lensed optics purposed to direct light toward at least one vertical surface and one horizontal surface below the luminaire.

These prior orientation specific optics patent documents demonstrate that light can be controllably directed to multiple surfaces in a precise manner illuminating surfaces where needed at the specified illumination intensity. The orientation specific luminaire and the non-orientation specific luminaire having an LED light source with optical lenses above directing emitted light to targeted surfaces are fully capable of performing their respective illumination tasks without the use of a reflector and/or a refractor.

Lowbay and highbay luminaires are commonly used in low and high mounting applications. Legacy lowbay and highbay luminaires light sources, such as HID, are no longer commonly used. The HID light source also referred to as a point source was replaced with the LED light source that is referred to as a planar light source. To deliver light efficiently from above, the HID luminaire commonly employed a reflector or a refractor. The advent of the LED light source with optical lensing eliminated the need for the reflectors or refractors.

Yet, for architecturally decorative reasons occasionally a need arises to enhance a luminaire's definition by directing a portion of the light emitted by the luminaire to pass through an intermediary medium such as a refractor. The refractor can diffuse, redirect, and scatter the emitted light, creating a glowing and/or sparkling effect on the exterior surface of the refractor.

To achieve the desired effect the present innovation employs at least one refractor, and a light source covered by an optical lens. The optical lens is configured to direct a substantial amount of the lamp's light toward the inner surface of the coupled luminaire's refractor. The number of lamps with their sideways light directing dedicated optical lenses can vary by at least one of the shape and/or size of the refractor, the distance the light source is from the inner face of the refractor, and the light output of the lamp with the sideways lensed optics.

The placement of the sideways light directing optical lenses for a round form luminaire, as shown in the following figures, can be in proximity to the luminaire's central vertical axis bottom surface. Placing the sideways lensed optics there can reduce the number of dedicated sideways light emitting lenses directing light onto the inner perimeter of the refractor with each having a wider beam spread angle. In at least one other embodiment, the lensed optics configured to direct a substantial amount of its dedicated lamp light toward the inner surface of the refractor can be at least at the outer perimeter of the surface retaining the floor facing surface.

The optical lens directing sideways light toward the inner surface of a refractor can be a standalone lens or can be incorporated into a lensed optical board that also includes at least one downward directed light lensed optics. The optical lens directing light sideways can sit on a pedestal, referred to herein as a raised lamp seat, providing better light exit angles to maintain uniform coverage across the inner surface of the refractor. Therefore, the bottom surface of the optical lens directing sideways light can be lower than the bottom surface of at least one optical lens directing light downward toward the floor surface, including such lens/es incorporated into the optical lensed board.

The lamp covered by sideways light directing optics can be controlled individually, in unison with other like sideways light directing optics and/or downward light directing optical lenses lamps. The control can be manual or automated via at least one wireless controller. The lamp also can be dimmed and/or modulated to turn on and off. The lamp covered by the sideways light directing lensed optics can vary by at least one of, dimension, chromaticity, color temperature, input power, and light output intensity.

The above LED light source discussed refers to "white light" LED having a color temperature commonly ranging between 2700-7000° K. An alternate light source that can be used to illuminate the refractor's walls is an LED light source emitting UV light. The UV light source/s can be arranged in the same or similar manner to the above-described white light emitting light sources and/or can be coupled to the PCB retaining the light sources or the heat dissipating structure in proximity to the perimeter of the luminaire.

The UV light emitted can be directed toward the inner portion of the refractor's walls with little or no UV radiation escaping to below the walls (not shown). The intensity of the UV light emitted can be such that it is harmless to humans unless humans are exposed to the UV light in proximity over a prolonged duration. Supplementary to the primary use of the UV light source, in at least one embodiment, at least a portion of the UV light emitted toward the refractor can be in the range that irradiates viruses and bacteria. In yet other embodiment, a dedicated UV light source can be used solely for virus and/or bacteria eradication.

The short wavelength UV emitted energy is barely visible to humans. However, when the UV energy contacts a medium, such as fluorescent, it causes the medium to glow converting the energy to a wavelength in the human's visible range. The fluorescent medium color temperature palate is wide and can be adjusted to the luminaire's ambient lighting light source color temperature.

The present approach is an alternative means to create a glow effect across the outer walls of the refractor wherein UV energy is directed toward the inner walls of a refractor having inner wall/s laced/coated with a medium the glows when excited by energy in the UV range spectrum and the light converted to a wavelength visible to humans is seen at least across the walls of the refractor's outer surface.

While the present description references a round form orientation specific luminaire, the sideways directing lensed optics can be used with any form luminaire employing a refractor with or without orientation specific optics.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

General Discussion of Embodiments

A luminaire's light source can be covered by an optical lens (which itself may include sub lenses) that controls the directionality of the emitted light. The light source may also be covered by a translucent protective lens, which disperses the luminaire's light in roughly a natural +/−120° light dispersion pattern of a LED lamp.

The LED luminaire with coupled LED lamps can also employ a reflector and/or a refractor. At least the refractor, or the refractor and reflector, can substitute for a protective optical lens over the LED light source. In embodiments discussed herein, both a protective lens over the LED and a refractor may be used together or separately. In at least one application, an electroluminescence coating and/or paint is applied to a surface of the refractor and/or embedded within the refractor causing the electroluminescence coating and/or paint to glow when power is applied to a light source.

The LED luminaire can have several forms including round, square, and rectangular. The decision to use one form of luminaire over another is driven by architectural, economic, and performance considerations. Among the performance considerations a designer must consider is whether each luminaire form provides for the light emittance pattern compatible with the needs of the space to be illuminated. These illumination needs can include at least one of, a horizontal and a vertical surface/s.

As recognized by the present inventor, objectives for a project to illuminate an elongated space at specified intensity levels to targeted surface/s should include using a minimal amount of energy, and generating minimum glare, while maintaining a good uniformity ratio (e.g., 3:1). To achieve these objectives, a lighting designer, when specifying a luminaire, would first need to evaluate whether the luminaire's form with its light emittance pattern is compatible with the space needs. The lighting designer may also have to consider the luminaire's orientation. Such a consideration becomes relevant where orientations of at least two like formed neighboring luminaires must be common and set in relation to the space in which the luminaires are mounted. For this reason, with at least one luminaire form, the lighting designer must consider the choice of the mechanical means of the luminaire support as it affects the associated labor component, the production time, and material costs.

The lens optics over the light source of a rectangular formed luminaire can generate a variety of light dispersion patterns; however, its architectural form imparts lighting directionality by having one horizontal central axis longer than the other horizontal central axis. Further, its installation may require more than one point of mounting support. As recognized by the present inventor, more than one mounting support point, as compared with a single support point, necessitates additional costly structural support members and requires longer installation time and thus increases the installation costs.

Lens optics over a square luminaire can also generate a variety of light dispersion patterns; however, for architectural reasons, it requires orientation alignment with other like luminaires. An advantage of the square luminaire over the rectangular luminaire, as recognized by the present inventor, is that it can be mounted from a single mounting point, and its form is directionally neutral.

Lens optics over the light source of a round luminaire are also directionally neutral. The luminaire can also be mounted from a single mounting point. Round luminaires are often used in retail and institutional spaces which are wide open, but conventional optics over round luminaires are not conventionally viewed as conducive for use in elongated spaces, mainly for their lack of directionality. The elongated spaces, for example, can be racked aisles within a big box retail space.

Corridors and aisles where rectangular, square, and round shaped luminaires are used represent a substantial portion of all real estate for retail "big box" outlets, warehousing spaces, and manufacturing spaces.

U.S. patent application Ser. No. 18/406,136, the contents of which is incorporated herein by reference, describes a mechanical orientation mounting device, which may be used with the orientation specific luminaire described herein. The present disclosure further elaborates on the mounting device's connectivity to a luminaire below it and a supporting structure above it.

A luminaire with or without orientation specific light source optics coupled to the orientation specific mechanical mounting device is able to have a user-settable alignment with a like luminaire and/or with a feature of the space in which it is disposed such as an aisleway below or a supporting structure above. Once the luminaire's orientation is set by way of setting the orientation of the mechanical mounting device, the mechanical mounting device can then be permanently secured, which in turn secures the luminaire in position. It is noted that having two cables and/or chains connecting the luminaire to a mounting device assures restoration of the luminaire's orientation to its set position under a condition where the luminaire is accidently hit by a moving object (e.g., a ladder being moved, etc.).

Further, the two suspended support mounting members provide redundant restraints, and thus can protect life and property, when one support mounting member fails. The orientation specific mechanical mounting device can be configured for a single point of connectivity to the structure above. The mounting device coupled to a luminaire can facilitate luminaire alignment regardless of the luminaire form and its optical light dispersion pattern.

In elongated spaces that include racked aisles (aisles have a floor flanked with racks/shelves or a wall on at least one side, but often on both sides), the luminaires can be tasked with illuminating the horizontal surfaces including the floor and furniture that rests on the floor, and the vertical surfaces including walls and/or face of the rack/s. In spaces intended to display merchandising product, the illuminance of the rack's vertical surface is of great importance, as this is where the merchandise is displayed and a shopper will observe it.

The merchandise is often displayed in proximity to an adult human's eye level (e.g., in an inclusive range of 3' to 7', but typically an average height of 5'). For convenience, this document will refer to eye level as being five feet above a finish floor, but the level can be anywhere between three feet and seven feet depending on the circumstances. Therefore, in elongated spaces where merchandise is displayed on racks, the luminaires are configured to provide the most intense light level/s to fall on the vertical face of the rack at about an adult human's eye level, where merchandise that is on display for sale is located. Above, and possibly below, the human eye level, the rack may include storage space for items that are housed until needed. The racked region above the rack(s) around human eye level are accessible via a lift, or ladder, by store personnel and often extend up to 30 feet or so above the finished floor.

Luminaires placed above an aisle flanked by elongated rack space are expected to deliver specified light levels at specific locations, or subregions, along the horizontal and vertical surfaces that define the aisleway. In merchandising and stocking spaces the intense light levels should illuminate vertical surface at, above and below an adult human eye level. In addition, in some applications, the luminaires may be configured to also illuminate the ceiling or support structure above.

An aspect of the presently described luminaire is that it directs its primary light source toward the floor below and/or at least one adjacent vertical surface. In at least one embodiment a plurality of luminaires with LED light sources coupled thereto are located above a racked aisle and are incrementally spaced apart from one another at predetermined distances, usually along a center plane that extends from the middle of the aisle and is parallel to at least one vertical racked wall at the edge of the aisle. Each of the luminaires' light sources are tasked with illuminating at least a portion of a vertical surface comprising the face of a rack adjacent to an aisle, and at least a portion of the aisle's floor surface.

To attain optimal efficiency, the form of a printed circuit board (PCB) that hosts the plurality of the LED lamps comes into play. The orientation of the LED lamps coupled to the PCB can differ from legacy practices, and include planar as well as non-planar topologies (e.g., curved such as parabolic surfaces, and the like). Over the LED light source (i.e., between the LEDs and the regions illuminated by the LEDs), an optical lens is positioned that directs the light toward horizontal and vertical targeted fields of illumination. The lens optionally includes a plurality of sub-lenses that can include at least one dedicated optical lens per LED. Likewise, the sub-lenses may provide the directed optics for a group of LEDs, such as 2, 3, 4 . . . 50. The group of LEDs may be linearly arranged, or grouped in two dimensional arrays if the PCB is planar, or even a 3 dimensional grouping with a PCB that is non-planar.

The present exemplary embodiment includes two crescent shaped PCB's populated with planar LED lamps. Each crescent shown in this embodiment is tasked with illuminating one or more sub fields of illumination on a vertical surface of a rack, as well as one or more sub fields of illumination of the floor of the aisle, adjacent to the lower edge of the vertical surface of the rack. In a different embodiment, the same PCB arrangement includes one or several sections. For example, a three section PCB can be configured with two sections to illuminate the racks, and the third section configured to illuminate the floor between the two racks. As a complement to the LEDs arranged on the crescent shaped PCBs, additional LEDs with optional directional, and orientation settable optics, may be be hosted in a central hub region that is unoccupied by the pair of crescent shaped PCBs, where the crescent shaped PCBs have an arcuate shape.

The PCB that retains a plurality of LED lamps thereon may be segmented into one or several boards, wherein the board/s can have at least one of a different form, orientation, and number of light sources coupled thereto. The optical lens/es (sometimes referred to herein as "optics") disposed over the PCB retaining the plurality of lamps directs the light emitted from the plurality of the LED lamps toward a designated subfield of illumination target. The targeted subfield of illumination can have at least one of, a specified horizontal and vertical light level intensity value. A subfield of illumination is a sub region of the vertical surface or horizontal surface of the elongated space (aisleway flanked with one or more vertical structures on either or both sides of the floor of the aisleway).

The PCB is fabricated with wiring that provides controllably amounts of electricity to the plurality of the coupled LED lamps and can be configured to controllably operate an individual lamp or groups of lamps. The control of the LED lamps can be different from one another and/or in unison with one another, having optical lens/es over a single or a plurality of LED lamps. The control can be provided by hardwired circuitry (e.g., application specific integrated circuit, ASIC) or programmable circuitry such as one or more processors having one or more central processing units (CPUs) coupled to one or more memories that hold computer readable code therein that, upon execution by the one or more processors, configures the processors to control the electrical flow and illumination control of the LEDs, and/or a luminaire driver, hosted by the luminaire.

The LED lamps coupled to the PCB can differ by at least one of, shape, size, input power, color temperature, and chromaticity. The luminaire driver/s and/or a controller can drive different LED lamps and/or plurality of grouped LED lamps.

The PCB, with or without the dedicated optics, can be replaceable. The PCB can be configured either as orientation specific or non-orientation specific. A switch and/or a rotatable dial device coupled to the luminaire can be configured to manually control (or controlled electrically via a controllable motor such as a stepping motor controlled by a local controller, or a remote wireless controller) at least one aspect of the operation of at least a portion of the lamps coupled to the PCB. In addition, the light emitted can be controlled via at least one of a local/remote communication device and/or sensing device/s.

To maintain an acceptable uniformity ratio of illumination, the light pattern emitted on a subfield of illumination from at least one luminaire can overlap another subfield of illumination. The subfield of illumination can be on a horizontal surface, a vertical surface, or a combination thereof. Given the small size of LED lamps, in at least one embodiment, the orientation of each LED lamp does not have to follow the same form as the surface of the PCB. For example, legacy round PCB's with coupled LED lamps commonly distribute the lamps in concentric rings about a vertical center axis of the PCB. By contrast, in at least one embodiment the LED lamps coupled to a PCB can be arranged orthogonally. In this arrangement, the orientation of at least one side of any one square LED lamp coupled to the PCB is substantially parallel to the orientation of the rack, and at least the adjacent side of the square LED lamp is substantially perpendicularly oriented to the rack.

As will be discussed in more detail below, the present innovation uses both the concentric and the orthogonally arranged LED lamps coupled to a crescent formed PCB of a luminaire mounted above a racked aisle. The LED lamp arrangement described can apply to any form of luminaire light source retaining surface. The orthogonal arrangement of the LED light sources with their respective optical lens/es enable better design control over the zonal distribution of the light emitted by the PCB section/s.

The design of the optical lens of the orientation specific luminaire accounts for at least one of, the luminaire's mounting height from the floor, the distance between a targeted surface and at least one luminaire coupled LED light source, the horizontal and/or vertical target light level intensity specified over a subfield of illumination, offensive glare angles, and inherent optical losses for the light emitted in any one direction.

Aisle widths of elongated spaces can vary by the building use type; however, in retail, manufacturing, and distribution spaces, the width of an aisle commonly ranges from six to twelve feet. Both the vertical surfaces of the elongated space and the elongated space floor can be divided into subzones configured in relation to a luminaire mounted above. The subzones can be further divided into short, medium and long zones. These zones can further be divided into a plurality of subfields of illumination that are contiguous to one another.

The luminaire mounted above an elongated aisle space can employ zone specific lens optics configured to illuminate at least two of the subfields of illuminations. In at least one embodiment, a luminaire with a plurality of lamps can target one or several subfields of illumination, wherein a subfield of illumination near the luminaire can be illuminated by wide angle optical lens/es covering a large subfield area, while a remote subfield can be illuminated by a narrower lens optics (with higher directivity) that may cover a smaller subfield area, albeit with a higher light intensity than without the higher gain optics.

The optics of the orientation specific luminaire is configured to attain specified light levels within a subfield of illumination. The specified light level is referenced herein as the target light level intensity. The lens/es can be placed over at least one of, a single LED lamp, a plurality of LED lamps, a single LED PCB, and a plurality of PCB's. The lens/es can couple to at least one of the PCB and the heat dissipating structure of the luminaire.

The present innovation teaches and shows novel illuminance ratios between the floor 1 of an aisle's horizontal subfield/s of illumination and/or a parallel to the floor horizontal surface above a luminaire, namely a ceiling surface 39 (FIG. 10) and at least one first vertical surface 2 subfield adjacent that is substantially perpendicularly oriented to at least one of the horizontal surfaces. The present innovation also teaches and shows novel illumination ratios between at least two subfields of illumination disposed on a first vertical surface 2 along an aisle.

The first vertical surface 2 can comprise at least three subfields that are vertically stacked on one another to form the full height of the first vertical surface 2. The subfields include the inclusionary range subfield 41 (FIG. 10), a bottom range subfield 42 (FIG. 10) that is defined in the vertical direction as the area extending between the aisle floor surface 1 and the bottom boundary 19 of the inclusionary range subfield 41 of the first vertical surface 2, and the top range subfield 43 that is defined in the vertical direction as the area extending between the top boundary 19 of the inclusionary range subfield 41 of the first vertical surface 2 and the top end of the top range subfield 43 of the first vertical surface 2. The length of the stacked subfields can extend the length of the first vertical surface 2 of the illuminated aisle 10.

In preceding applications, the applicant has described that the light level intensity across the vertical height of the first vertical surface is distributed in such a manner that the highest average light levels, vertically measured, fall on the inclusionary range subfield 41 surface followed by the bottom range subfield 42 surface and then followed by the top range subfield 43 surface. The top range subfield 43 shows the lowest average light levels.

In preceding applications, the applicant has described that to minimize glare, the high angle light rays emitted by the orientation specific luminaire 5 over an elongated space aisle are directed toward the at least the first vertical surface 1 of the aisle. The applicant teaches and shows that light exit angles exceeding 45° from nadir are considered glare angles to be avoided.

The present application further expands human visual acuity perceived by controlling the light intensity, relative light uniformities across a plurality of surfaces 1, 2, 39, and perceived luminaire glare.

The lighting industry has established a standard to rate glare. The Unified Glare Rating (UGR) standard regards the value of 30 UGR as extremely visually discomforting whereas 10 UGR is regarded as almost unnoticeable glare. The present application sets 20 UGR as the top acceptable limit for the at least the orientation specific luminaire's 5 and a like in form luminaire perceived glare. The UGR value for luminaires 5 suspended over a racked aisle 10 with an adult human 20 positioned at the central longitudinal axis of a racked aisle 10 looking straight down the aisle is configured to be at 16.0 UGR or less.

It is noted that along with improved uniformity ratios, directing light to where it is needed, maintaining well balanced uniformity ratios, and limiting a luminaire's apparent glare is important. Low glare levels allow the human eye pupil to relax. The pupil can then expand, resulting in an increase in a person's visual acuity. As the person's visual acuity improves, less intense light is needed to perform a task while the person's visual comfort improves. In addition, lowering the light intensity contributes to energy usage reduction with the corresponding reduction in associated costs.

To maintain balanced illumination within an enclosed space, every surface 1, 2, 39 exposed to an occupant's eyes should be illuminated. In lighting applications where two light sources 3, are flush mounted, the mid-point on the ceiling surface 39 above and between should not be dimly lit. If the mid-point is dimly lit, an occupant will perceive the light sources 3 as excessively harsh regardless of the illumination quality below the light source 3.

The present orientation specific luminaire 5 and a non-orientation specific luminaire of similar type are configured to be suspended from a ceiling surface 39 above, with at least one light source 3 directed toward the above ceiling surface 39. The light source 3 directing light toward the ceiling surface 39 above can be above the light source 3 that directs light down toward a floor 1 and/or toward at least one first vertical surface 2. The light source coupled to the luminaire 5 configured to direct light toward the ceiling surface 39 can be positioned in a manner that the emitted light is unobstructed by the luminaire 5.

To maintain well-balanced ceiling surface 39 illumination, the illumination designer must know the illumination light level requirements for the floor surface 1 and the at least one first vertical surface 2 illumination target level. The designer should then decide on reasonable illumination ratios within any one subfield/range of illumination surfaces and acceptable ratios from one surface to another. Once decided, the designer can specify the light source output and the luminaire's lens optics 24 emitting the up-light component.

The optical lens 24 over the light source 3 emitting light toward the ceiling surface 39 above typically emits a wide pattern beam with a lesser flux intensity perpendicular to the planar surface of the light source 3 than the flux intensity directed sideways. The light source 3 flux intensity can be configured in relation to the distance between the light source 3 and the ceiling surface 39 to be illuminated above, the ceiling surface 39 area to be illuminated, the average light level target, and the illumination uniformity ratio to be attained.

The orientation specific luminaire 5 and a like luminaire type can also retain a down facing light source 3 that is configured to illuminate a path of egress onto the floor 1 below. In at least one embodiment, the egress light source 3 can couple to a bottom surface of the orientation specific luminaire 5 and can rotate about its vertical axis. The egress light source 3 can operate independently of other coupled light sources 3 emitting at least one linear light pattern over a floor below the luminaire 5.

Finally, it is further taught that the human eye naturally gravitates toward the brightest surface within an enclosed space. To save energy and to improve visual acuity and human visual comfort, it is important to establish balanced illuminance values within each subfield and a balanced illumination relationship between one subfield surface and another. These relationships can be quantified and can be expressed by means of ratios.

Establishing the illumination ratios between several exposed surfaces while meeting illumination light level targets where needed and generating good uniformity ratios within subfield surfaces in a manner that the human eye perceives as a well-balanced assembly constitute the essence of well-balanced lighting design.

The essence of good lighting design lies with establishing balanced illumination ratios over exposed room surfaces while meeting target illumination light levels where needed and maintaining good uniformity ratios within the bounds of the surface's subfields. The optical and mechanical innovations of at least the present orientation specific luminaire make energy efficient, well-balanced and pleasant lighting design uniquely attainable. To attain the desired results, at least one of the following principles and illumination design ratios is utilized:

a) The average maximum to minimum ratio of the horizontal light level measured on the aisle floor 1 between two orientation specific luminaires 5 adjacent to a first vertical surface 2 is greater than the average light level over a top subfield range 43 of the same first vertical surface 2 measured vertically and between the same two orientation specific luminaires 5 and the aisle floor surface 1 below.

b) The average light level measured vertically over the surface of the bottom range subfield 42 of a first vertical surface 2 located adjacent to and between two orientation specific luminaires 5 is greater than the average vertical light level measured vertically over the surface of the top range subfield 43 located on the same first vertical surface 2 above, adjacent to, and between the same orientation specific luminaires 5.

c) The average light level measured vertically over a surface within the inclusionary range subfield 41 is greater than the average light level measured vertically over a surface of a top range subfield 43 directly above that extends upwardly to the top range subfield 43 top end.

d) The average horizontal light level measured on a surface of an aisle 10 floor 1 between two suspended from above orientation specific luminaires 5 and an adjacent first vertical surface 2 is equal to or greater than the average light level vertically measured over the surface of an inclusionary range subfield 41 of the same adjacent first vertical surface 2 located between the same two orientation specific luminaires 5.

e) The maximum to minimum illumination uniformity ratio between the average light levels vertically measured over the surface of an inclusionary range subfield 41 of a first vertical surface 2 and the average light levels vertically measured over the surface of the bottom range subfield 42 directly below the inclusionary range 41 is equal to or less than 1.5:1.0.

f) The maximum to minimum illumination uniformity ratio between the average vertical light level measured over a surface of an inclusionary range subfield 41 of a first vertical surface 2 and an average vertical light level measured over a surface of the top range subfield 43 directly above the inclusionary range 41 is equal to or less than 5.0:1.0.

g) The inclusionary range subfield 41 height from the floor surface 1 remains unchanged despite variance in at least one of, a dimensional height of the inclusionary range subfield boundary 19, the width of the aisle adjacent to a first surface, the spacing between two orientation specific luminaires 5 adjacent to a first vertical surface 2, and the orientation specific luminaire 5 mounting height adjacent to a first vertical surface 2.

h) The UGR value for luminaires suspended over a racked aisle with an adult human positioned at the central longitudinal axis of a racked aisle 10 is configured to be at 16.0 UGR or less.

i) The orientation specific luminaire 5 can have a first lensed light source 3 that directs ambient light downward toward a floor surface 1 and at least one inclusionary range 41 of a first vertical surface 2 and a second lensed light source 3 that directs light toward a ceiling surface 39 above, wherein the intensity of light emitted by the first light source 3 is greater than the intensity of light emitted by the second light source 3.

j) At least one sideways directed light ray 16 of a light source 3 that is coupled to an orientation specific luminaire 5 and configured to illuminate a ceiling surface 39 above has greater intensity than the intensity emitted by the same light source 3 also directed toward the ceiling surface in the opposite direction to the orientation specific luminaire's 5 nadir 35.

k) The horizontally measured maximum to minimum average uniformity ratio of a horizontal surface above and between two adjacent orientation specific luminaires 5 is equal to or less than 4.0:1.0.

l) The maximum to minimum average uniformity ratio between a horizontal surface above and between the two adjacent orientation specific luminaires measured horizontally and a floor horizontal surface directly below horizontally measured is equal to or less than 8.0:1.0.

m) At least one light source other than an ambient light source can couple to the orientation specific luminaire 5 and a like in for luminaire wherein the light source 3 can exhibit at least one property of being switchable, controllable, and detachable.

n) An egress light source 3 can couple to the floor facing side of the orientation specific luminaire 5.

o) The maximum to minimum average uniformity ratio of at least two subfield ranges of the first vertical surface 2 illuminated by at least one adjacent orientation specific luminaire 5 with at least one ambient light source 3 illuminating a ceiling surface 39 above is equal to or less than 5.0:1.0.

p) The maximum to minimum light level average ratio of an inclusionary range subfield 41 of the first vertical surface 2 measured vertically located adjacent to and between two orientation specific luminaires and the light level average ratio of a horizontal surface disposed above the same orientation specific luminaires measured horizontally is equal to or less than 4:1.

q) A coupled optical lens 24 over a lamp 3 directs light toward a floor surface 1 below and at least one subfield range 41, 42, 43 of a first vertical surface 2 and a second optical lens 24 over a lamp 3 directs egress light down toward a path of egress on a floor surface 1 below.

r) The orientation specific luminaire of claim 15, wherein a third light source 3 coupled to the housing of the luminaire is configured to direct ambient lighting toward a ceiling surface 39 above the luminaire 5.

s) The egress light source 3 is configured to rotate about its vertical axis and/or be fixed to the luminaire housing and emit an elongated light pattern that is consistent with at least the long central axis of the aisle below.

t) The maximum to minimum uniformity ratio between two adjacent egress light sources 3 that are coupled to orientation specific luminaires 5 measured horizontally above the floor surface between the two luminaires is equal to or less than 10.0:1.0.

u) A coupled optical lens over a lamp directs light toward the floor below and subfield ranges of a first vertical surface and, a second light source optical lens directs egress light down toward a path of egress on a floor surface below.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 12*a* shows a single planar surface retaining a PCB board with light sources. FIG. 12*a* shows at least two planar surfaces retaining PCB boards with light sources.

DETAILED DESCRIPTION WITH REFERENCE TO DRAWINGS

Figure 1:
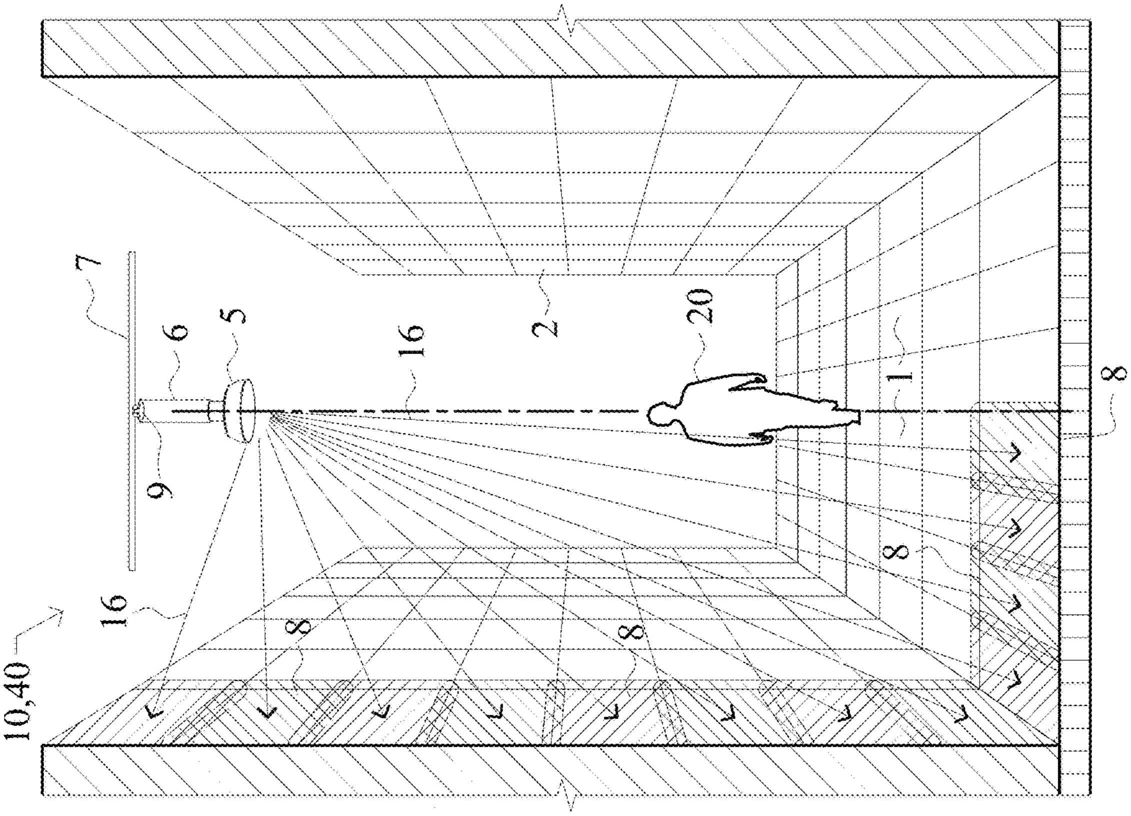
FIG. 1 shows a perspective view of an elongated space with subfields of a light emittance across a vertical wall/rack and a horizontal floor surface of an elongated space.

FIG. 1 shows a conceptual zonal diagram for a light dispersion arrangement illuminating vertical wall/rack and horizontal floor surfaces of an elongated space. The orientation specific luminaire 5 is shown suspended by two cables/chains 6 over a racked aisle 10. The cable/chain 6 suspension elements are coupled to a mechanical orientation device 9 that is secured to a support structure 7 above. It is noted that the present arrangement converts a two-point mounting to a single point mounting. The luminaire's two-point mounting enables plumbing and orienting the luminaire regardless of the luminaire form. It also assures restoring the luminaire to its original orientation following colliding with a moving object.

In a different embodiment, at least one element of the mechanical orientation device can couple the top surface of the luminaire enabling the luminaire to rotate about its central vertical axis. The single point mount can eliminate the need for a secondary support structure (not shown), saving material costs and installation production time.

The single point mount can eliminate the need for a secondary support structure (not shown), saving material costs and installation production time. The present embodiment includes an orientation specific luminaire 5 with orientation specific optics and a mechanical orientation device that enables orienting the luminaire 5 in relation to at least one of, the longitudinal axis of the racked aisle 10 and a vertical surface of a rack face 2.

FIG. 1 shows an adult human 20 traversing the racked aisle 10. Light rays emanating from the orientation specific luminaire 5 are shown directed toward subfields of illumination 8. The subfields of illumination 8 are quilted across the horizontal floor surface 1 and the vertical rack faces 2. The subfields of illumination 8 extend the full length of the racked aisle 10 wherein in a long aisle a plurality of orientation specific luminaires 5 are spaced apart at increments that enable adequate illumination coverage across the horizontal surface 1 and the vertical racked surfaces 2. In this example, the subfields are 2.5' high by 4' wide, although subfields of different dimensions may be used as well (e.g., heights varying between 6" to 6', and widths from 6" to 10').

For graphic clarity the present figure shows the light rays 16 extending away from the orientation specific luminaire across only one half of the racked aisle 40. The light rays 16 also show only one vertical slice of light rays 16 extending from the aisle floor 1 to the top tier of the racked surface 2. The light rays illuminating the targeted subfield of illumination can overlap their illumination coverage onto at least one adjacent subfield of illumination 8. It is noted that precisely overlapping the illumination coverage over the subfields of illumination 8 can improve the illumination uniformity of the entire field of illumination.

Figure 2B:
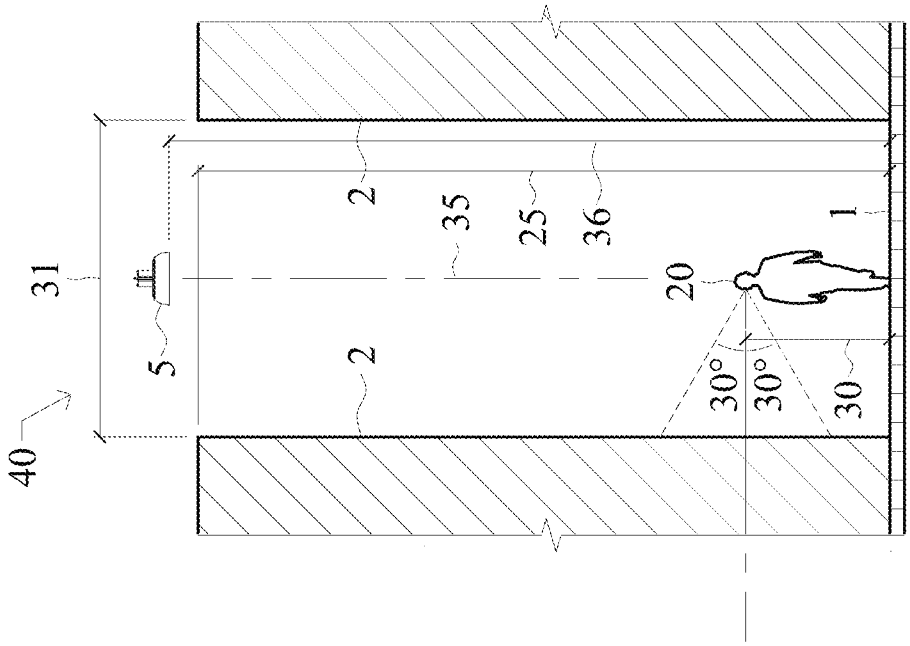
FIG. 2*b* shows a transverse section of a typical racked aisle in relation to the eye level for the typical adult human.
Figure 2A:
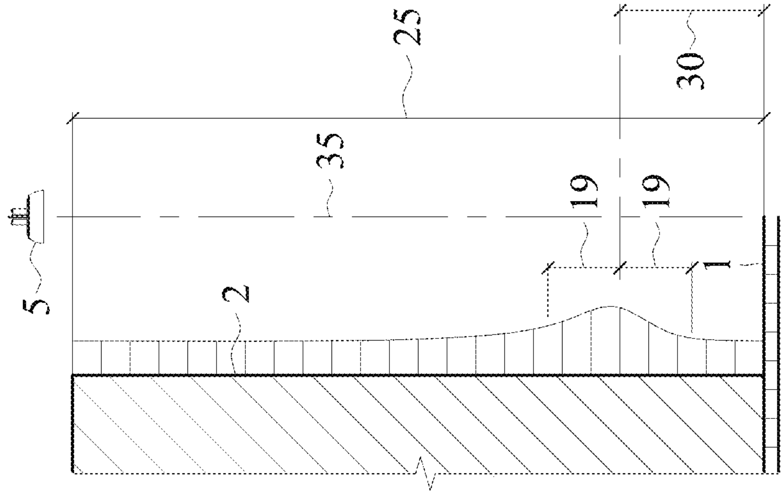
FIG. 2*a* shows a partial transverse section through a vertical surface with an illustration of an overlaid vertical light level distribution over the vertical surface in reference to eye level for a typical adult human.

FIG. 2*a* shows a partial transverse section through a vertical surface showing with a conceptual vertical light level illuminance intensity (region shown with horizontal lines therein) in reference to an average adult human eye level. FIG. 2*b* shows a transverse section of a typical racked aisle in relation to the adult human eye level.

FIG. 2*a* shows the intensity of the vertical illuminance on a vertical surface within an elongated space peaking at an adult human eye level 30, or adjacent to and above and/or below an adult human eye level, where the highest light intensity is needed. The specific lensed optics of the orientation specific luminaire 5 mounted above the horizontal aisle surface 1 is configured to direct light from nadir outwardly in an asymmetrical pattern. In this example, the light intensity distribution has a peak level in a subzone (subfield) that is a height occurring at the height of eye level of an average adult human. The shape around the peak is generally Gaussian in distribution (i.e., bell curve), which is a result of overlapping light patterns directed toward the height of eye level of an average adult human, although having some dispersion about the peak level defined by a standard deviation 19 around the peak level as set by an overlapping of a relatively large number of dispersion patterns from respective LED/lens groups (e.g., pairs). A light level intensity below the inclusive range is no less than 0.6 times the light level intensity within the inclusive range.

The exit angles of the emitted light, the lens light dispersion optical pattern, and the LED lamp intensity are set in relation to the height 25 of the vertical surface 2 that the orientation specific luminaire 5 is tasked to illuminate. FIG. 2*a* shows a ratio that is limited to maximum to minimum ratio of 3:1 between the highest and the lowest vertical illuminance on the vertical surface 2 vertically measuring across the full height 25 of the vertical surface 2 from the floor 1 up. For example, if the specified vertical light level target on a vertical surface of an elongated space is set for 30 FC at the height of an adult human eye level within the inclusive range, the lowest vertical light level measured vertically across the same surface from the floor surface 1 up does not fall under 10 FC—as shown in FIG. 2*a*.

It is noted that the structure of the present embodiment re-directs light from a light source from a horizontal planar surface of the orientation specific luminaire 5 onto a vertical surface 2 of an elongated space, concentrating the light emitted along a horizontal band 19 at a specific height above a floor 30 while maintaining an excellent maximum to minimum uniformity ratio of 3:1 across the entire surface of the vertical surface 2. The vertical uniformity ratio discussed can be constructed as a base line for good design. The lensed optics of the present orientation specific luminaire can be configured to provide better lighting uniformity ratios.

FIG. 2*b* shows a transverse section of a typical racked aisle in relation to the adult human eye level. Visually pairing the side-by-side FIGS. 2*a* and 2*b*, one can see that the adult human eye 30 has a cone of vision of approximately 60° from the horizontal −30° up and 30° down.

Therefore, the eye coverage of an adult human looking straight at a vertical surface 2 of an elongated space illuminated by an orientation specific luminaire 5 falls on a higher vertical illuminance band extending across a portion of the vertical height 25 of the vertical surface 2. The vertical illuminance band width can vary based on the width of the horizontal aisle 1 and/or the placement of the orientation specific luminaire 5 above. However, the illumination ratios pertaining to the vertical illuminance on the vertical surface 2 of the elongated space can remain unchanged.

Figure 3B:
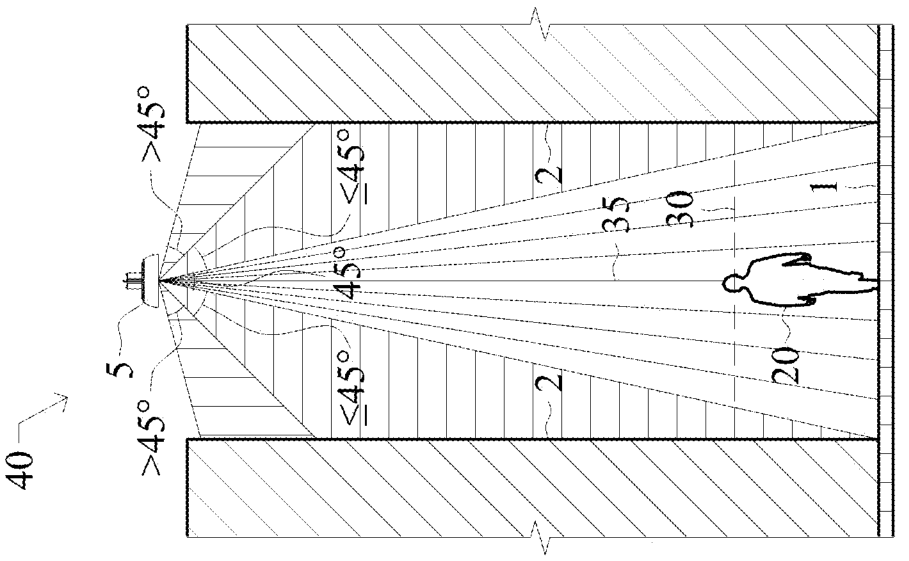
FIG. 3*b* shows the light exit angles of the same luminaire as in FIG. 3*a* although taken transversely across the elongated space.
Figure 3A:
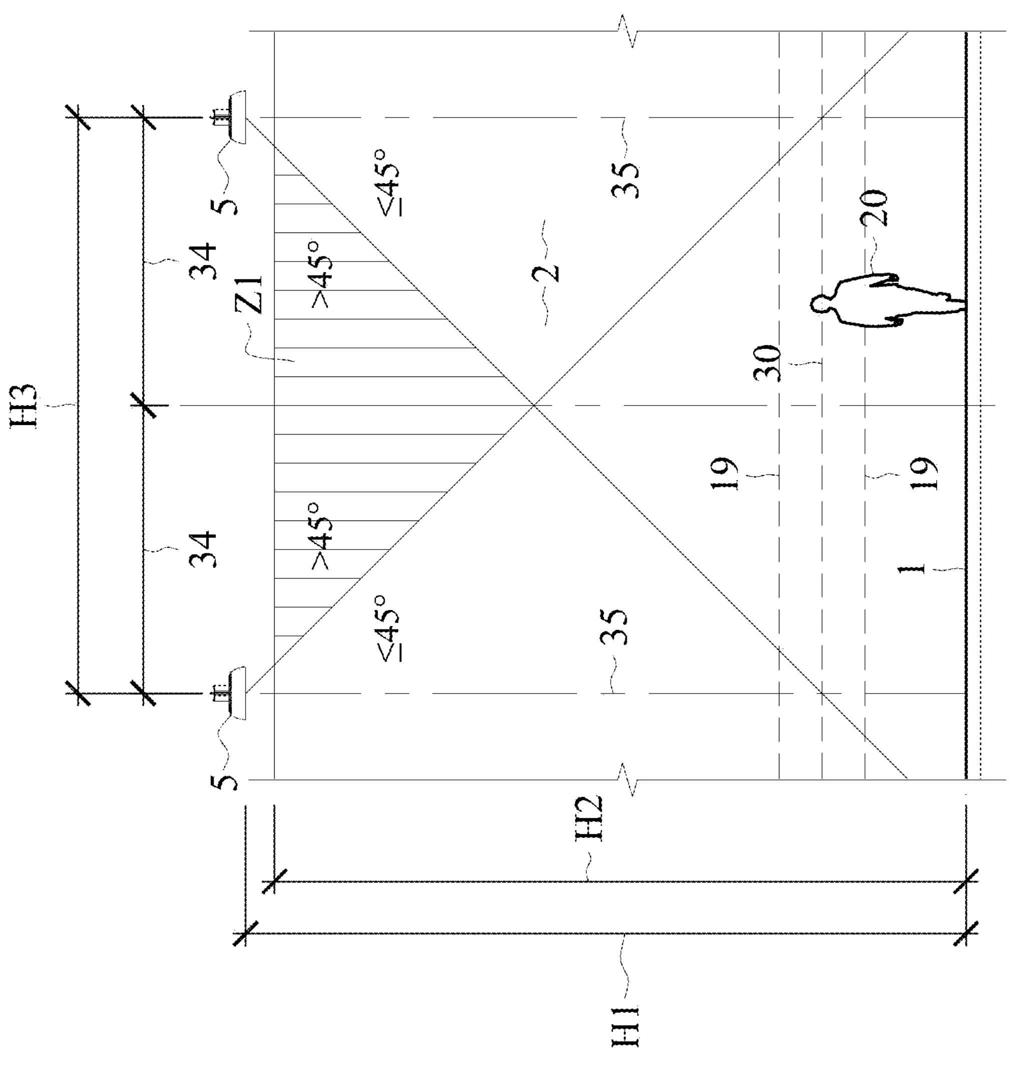
FIG. 3*a* shows light exit angles above a luminaire nadir of a luminaire suspended above a surface of an elongated space.

FIG. 3*a* shows light exit angles above a luminaire nadir of a luminaire suspended above a surface of an elongated space. FIG. 3*b* shows the light exit angles of the same luminaire taken transversely across elongated vertical space.

FIG. 3*a* shows two orientation specific luminaires 5 mounted above a horizontal aisle surface 1 illuminating a vertical surface 2. The luminaires' spacing H3 and mounting height H1 shown corresponds to the luminaires' light source output and the lensed optics arrangement. The present figure shows 45° to nadir 35 as the highest light exit angle from the luminaire 5. Light emitted by the luminaire 5 and directed toward the horizontal aisle surface 1 is configured to be glare free (<46° exit angle) and to uniformly illuminate the aisle surface 1.

A scaled adult human traversing the horizontal surface of the elongated space aisle 1 is shown juxtaposed next to a high vertical surface 25. The vertical surface 2 represents a racked surface. The adult human eyes level 30 above the horizontal aisle surface is approximately 5'-0" as shown in dashed line.

The adult human cone of vision is approximately 60°. The eyes of an adult human looking straight at the rack 2 face perceive a vertical area centered at approximately the human eye level 30. The intense illuminance band extending the length of the vertical surface 2 face is formed by the adjacent surfaces above/below (dashed lines 19) the human eye level 30. The portion of the surface within the upper and lower dashed lines of horizontal band 19 is an illustration of the inclusive range.

The figure illustrates that by dividing the light emitted through each luminaire 5 lensed optics into a horizontal surface and a vertical surface, the overall luminaire efficiency is increased. Limiting the horizontal surface 1 optical light exit angle of the luminaire 5 to a maximum of 45° reduces luminaire's optical losses and eliminates veiling glare, wherein the balance of the downwardly directed light of the luminaire 5, that includes high exit angle light rays, can then be directed away from the eyes of an adult human traversing the horizontal surface of the aisle 1 toward the vertical racked surface 2.

FIG. 3*a* shows the light exit angles of the same luminaire as shown in FIG. 1 taken transversely across elongated vertical space. The figure shows the luminaire 5 mounted over an elongated space of a racked aisle 1. The luminaire 5 shown is positioned at approximately a mid-point of the aisles' width having the same illumination requirement on the faces of the racks 2, as the racks are equal in height. In a different embodiment (not shown), the light pattern emitted from one side of an orientation specific luminaire 5 can be different from the light emitted by the opposite side of the luminaire.

The distance between the two luminaires 5 mounted above an elongated space has financial implications for material, installation, energy, and maintenance costs. Therefore, spacing luminaires as far apart as possible is desirable.

The optical lenses of the orientation specific luminaire are configured to provide the light level intensity where needed, maintain lighting uniformity, and reduce glare while positioned far apart. It is noted that the H3/H1 ratio (known as the spacing to mounting height ratio) of the present orientation specific luminaire coupled to the lensed optics can be at least 1.35.

FIG. 3*b* shows a symmetrical light emittance pattern (distribution) of two luminaires' light emittance angles in reference to their respective nadirs 35. The luminaires are arranged in relation to at least one of, the vertical surfaces of the racks' face 2 and the central longitudinal axis of the elongated space racked aisle 1. The luminaire's lensed optics is shown to divide the emitted light into a component tasked with illuminating the horizontal surface 1 and a component tasked with illuminating the vertical surface 2 of the elongated space.

The component tasked with illuminating the vertical surface 2 is further divided into two horizontal bands, one that illuminates vertical surfaces equal to or less than a 45° exit angle in relation to nadir, referred to herein as the low angle band, and the other band where the light exit angles in relation to nadir exceed 45° referred to herein as the high angle band. It is noted that the high angle band is higher than the eye level of an adult human 30.

Further, a review of FIGS. 3*a* and 3*b* shows that the distance to the mid-point of a pair of luminaires 5 spaced apart H3 is relatively short in relation to nadir. That said, the proximity from the luminaire's nadir to the high band mid-point 34 vertical surface 2 is relatively short (see FIG. 5*a* crosshatched triangle). While high angle optics emitted through a horizontal planar surface facing downwardly can incur greater losses, the small area and the proximity to the luminaire 5 nadir 35 can offset these losses. In at least one different embodiment (not shown) at least one secondary non-horizontal planar surface with at least one light source coupled with a lensed optics can illuminate a vertical surface 2 more efficiently having a lesser light exit angle.

Figure 4:
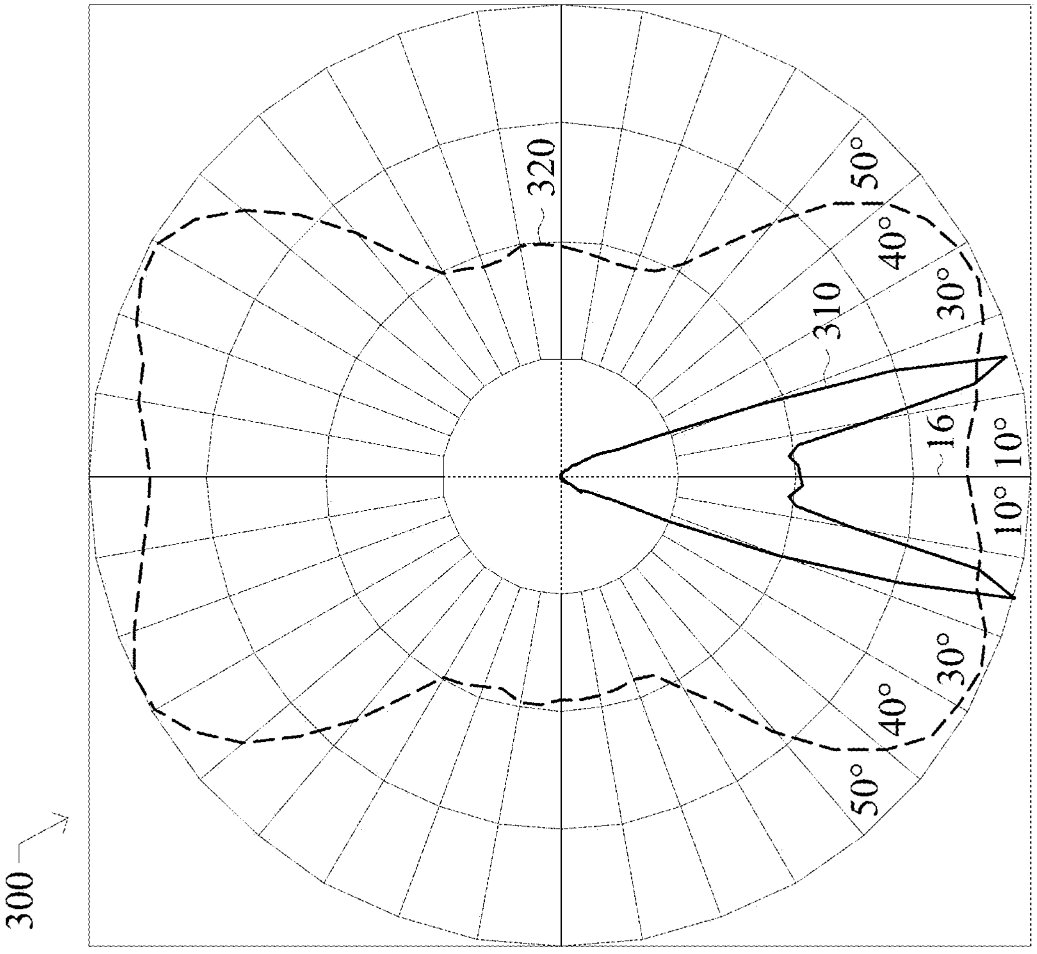
FIG. 4 is a polar diagram of the light intensity emitted by lensed optics of the orientation specific luminaire, with one contour in dashed lines being a light intensity envelope horizontal (looking sideways) to the lensed optics, and the other contour in solid line being vertical to the lens optics (looking down).

FIG. 4 is a polar diagram 300 of the optical light distribution pattern from the lensed optics of the orientation specific luminaire. The polar diagram 300 a vertical component and a horizontal component of the light distribution pattern. The vertical light distribution pattern 310 shows the light distribution in vertical plane from the luminaire and the horizontal light distribution pattern 320 from the luminaire. The diagram is divided into four quadrants. The luminaire (not shown) is positioned at the vertex common to the four. Concentric rings are shown arranged around the vertex. Each ring shows a different luminosity intensity of the light emitted. Rings closer to the vertex have less light intensity emitted than rings closer to a periphery of the polar plot. Radial lines originating outside the vertex indicate polar angles by degree wherein nadir is pointed down. The polar angle dividing lines are shown at 100 increments.

The polar diagram of the lensed optics of the orientation specific luminaire shows that peak vertical light emittance from the luminaire in relation to nadir 16 is between 20° and 20° (e.g., 15°) on either side of nadir 16 transversely to the elongated space longitudinal axis. The radiation pattern in the vertical component is highly directional as it has no up-light component and a lower light emittance intensity between nadir 16 and 10° at both sides of nadir 16.

The polar diagram of the lensed optics of the orientation specific luminaire shows that the horizontal light emittance pattern from the luminaire is roughly rectangular, with no null zones, wherein the longitudinal long axis of the pattern generated coincides with the long longitudinal axis of the elongated space or is parallel to at least one adjacent vertical surface. The pattern also shows relative equal light emittance intensity along the long "legs" of the rectangular pattern. The light emitted along the long legs is configured to illuminate the vertical surfaces of the elongated space.

Figure 5A:
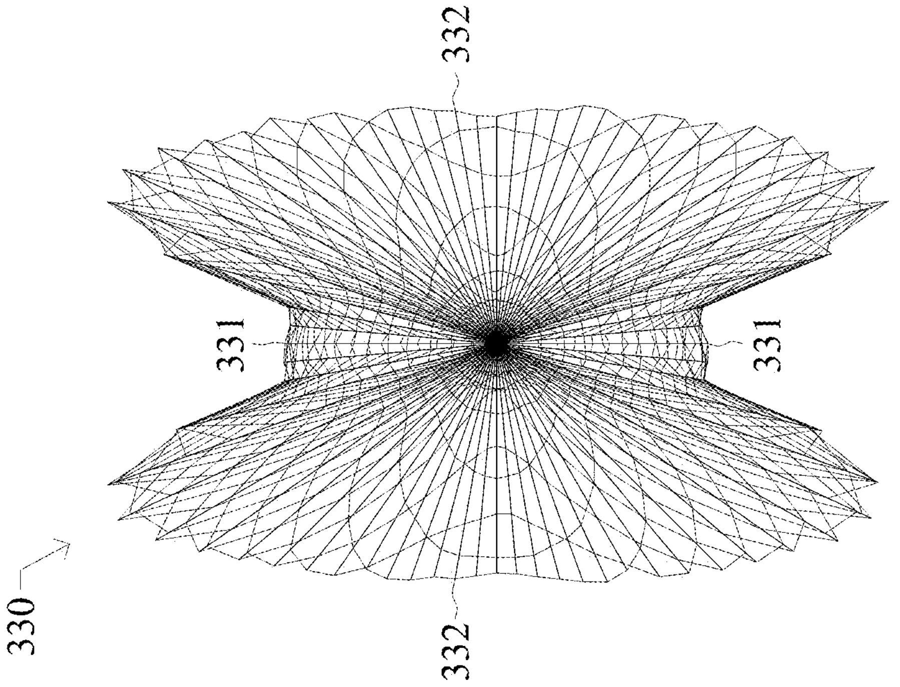
FIG. 5*a* and FIG. 5*b* show bottom and side views of the lensed optics light distribution pattern.
Figure 5B:
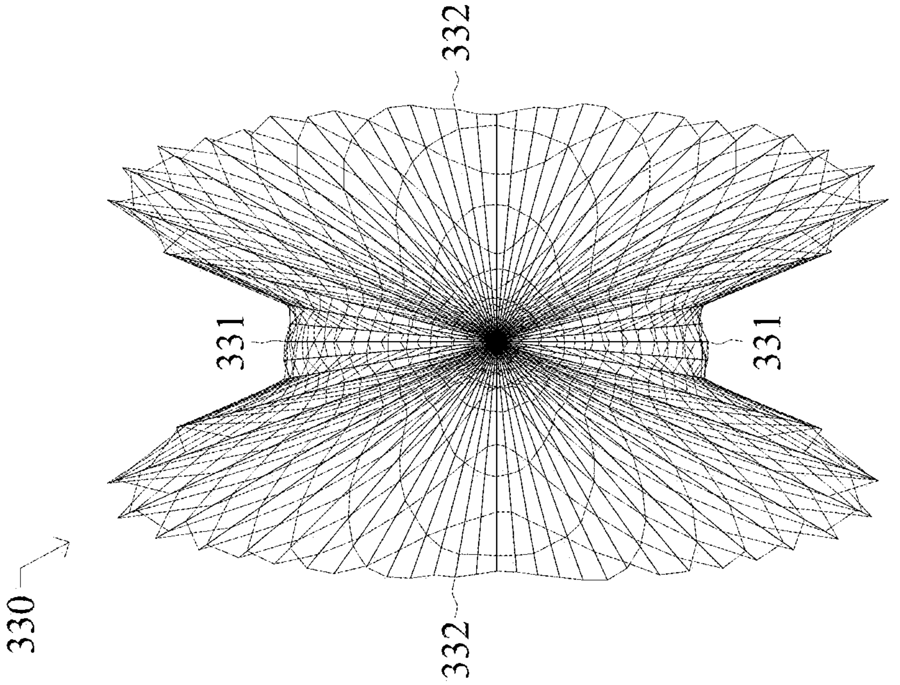

FIGS. 5*a* and 5*b* show the bottom and side views of the lensed optics light distribution pattern.

FIG. 5*a* shows a bottom view of a 3D wire frame web 330 representing the light emittance pattern for light emitted through the optical lenses of the orientation specific luminaire. The lines drawn represent both light emittance intensity and directionality. The "butterfly" pattern shows asymmetrical light distribution. The luminaire optics is configured to be placed over a walking aisle of an elongated space. The "wings" of the "butterfly" extending outwardly from the center show the vertical surfaces directed light 332.

The present figure shows the "wings" extending outwardly and away from one another in the opposite direction. This emission pattern shown infers that each of the "wings" is configured to illuminate vertical surfaces at an opposite side to one another. In a different optical arrangement, where an only one sided "butterfly" wing is used, the luminaire light emittance is directed toward a single vertical surface. In at least one lens optical embodiment, the other side of the lens can have a different light distribution.

The floor directed light 332 of the present wire frame 3D web is shown between the two "wings". The floor directed light 332 intensity outwardly is shorter than the vertical surface directed light 332. The present innovation restricts the light emitted over the horizontal surface of the elongated space to eliminate/reduce apparent glare by limiting the light exiting the luminaire to below 45° from the luminaire's nadir. As a result, the light emission intensity pattern is shorter.

As with the horizontal light emittance pattern shown in FIG. 4, the generated 3D wire frame web form of the present figure shows the outer sides of the "butterfly" "wings" relatively long and straight. The linearity of the "wings" form indicates a relatively consistent light emission intensity across the illuminated vertical surfaces.

FIG. 5*b* shows a top view of a wire frame web 3D representing the light emittance pattern for light emitted through the optical lenses of the orientation specific luminaire. The light intensity pattern from the above view is substantially like the view from below shown in FIG. 5*a*.

Figure 6B:
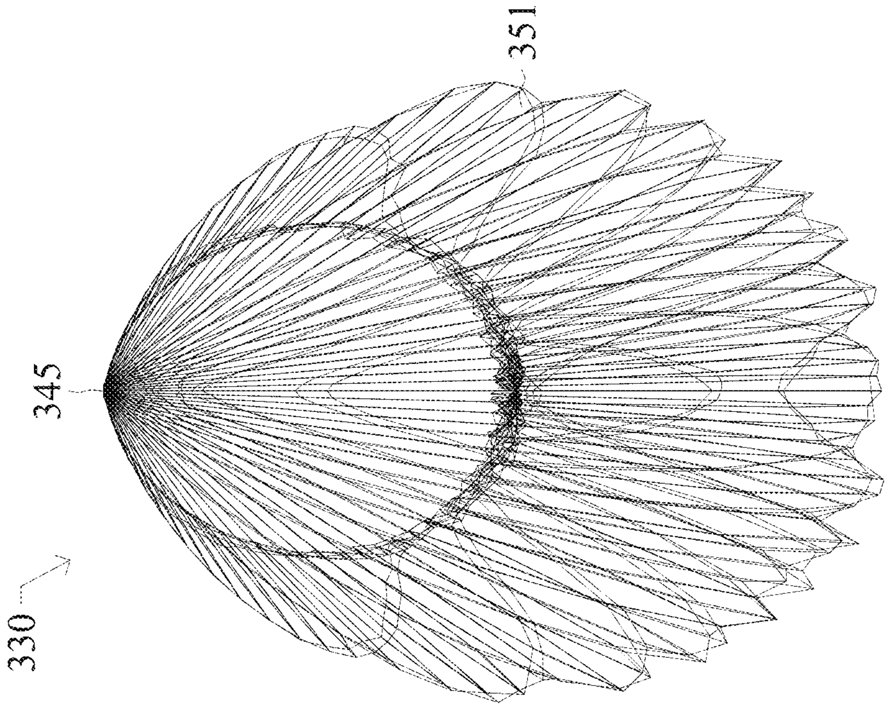
FIG. 6*a* and FIG. 6*b* show a longitudinal cross view and a parallel side view of the lensed optics light distribution pattern.
Figure 6A:
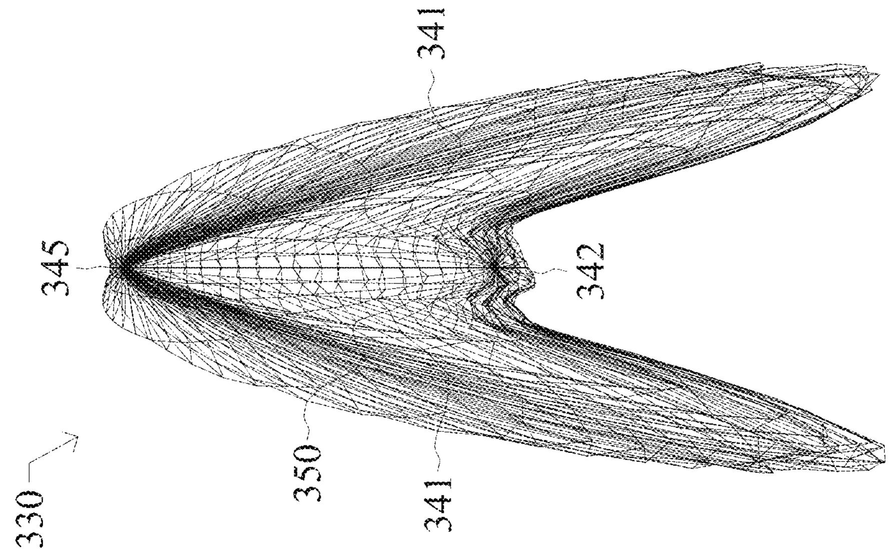

FIGS. 6*a* and 6*b* show the cross elongated space section and a longitudinal section through the lensed optics 3D wire frame web of the luminaire, respectively.

FIG. 6*a* shows the light source position 345 above the cross-emission pattern 350 3D wire frame web 330. The cross pattern shows the profile of two legs of light emission beams 341 extending down and away from the light source position 345. Each of the legs is configured to illuminate a vertical surface in the elongated space. Between the two legs, the intensity of light emittance is shown shorter. The bottom directed light beam profile 342 is configured to primarily illuminate the horizontal surface below the luminaire.

FIG. 6*b* shows a longitudinal section through the lensed optics 3D wire frame web of the luminaire parallel with the longitudinal long axis of the elongated space. The light source position 345 is shown at the top of the wire frame web 330. The vertical ellipsoidal form of the light emitted shows a wide longitudinal emittance pattern 351 when placed side by side next to the FIG. 6*a* cross section view. The darkened smaller ellipse outline represents the light intensity pattern directed toward the floor surface below.

Figure 7A:
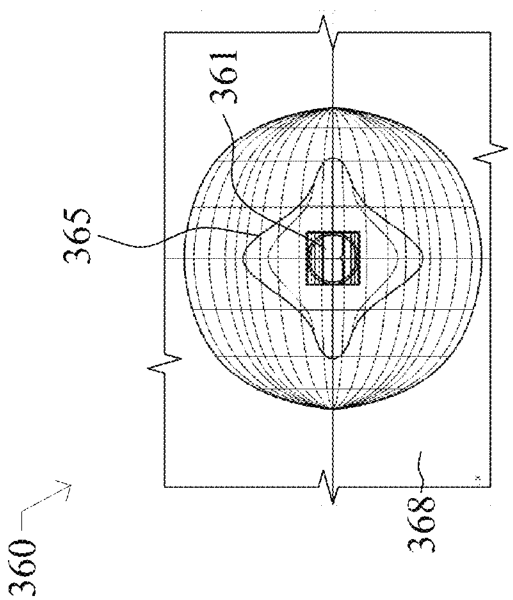
FIG. 7*a* is an upward view of a single optical lens.

FIG. 7*a* is an upward view of the structure of an optical lens (domed lens 360) that is disposed over a lamp 361 (e.g., LED) mounted on a lamp retaining surface 362 of a substrate (lens board structure 368). The LED 361 is mounted at the center such that light emitted from the LED 361 propagates through the material of the optical lens and is redirected by the optical lens according to the light emittance patterns discussed above with respect to FIG. 4 through FIG. 6*b*. The optical lens structure 365 from the upward view in FIG. 7*a* has a rounded outer perimeter, and 4-pointed star inner shape with rounded edges, as seen in FIG. 7*a*. The domed structure can be coupled to at least one more like dome structure to form an optical lensed board structure 368.

The lens board structure 368 with the plurality of lamp dedicated lenses can be mounted to a luminaire structure positioned precisely over the lamp the individual lens is dedicated to. A luminaire can employ at least one lens board structure. The lens board structure 368 can include domed lenses that are at least one of, a symmetrical light distribution pattern, an asymmetrical light distribution pattern, and a combination of both light distribution patterns thereof.

Figure 7B:
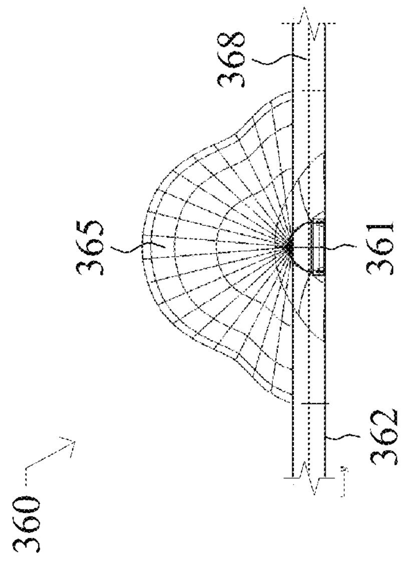
FIG. 7*b* is a view of the optical lens that is from a direction parallel to the vertical sidewalls of the walkway.

FIG. 7*b* is an elevation viewed from a direction that is parallel to the vertical rack faces 2 (FIG. 1). The optical lens profile in this view is somewhat bell-shaped and optimized to direct light over the height of the adjacent rack. Directing light in this manner creates a maximum illuminance at eye level with a smooth decrease over the top of the rack.

Figure 7C:
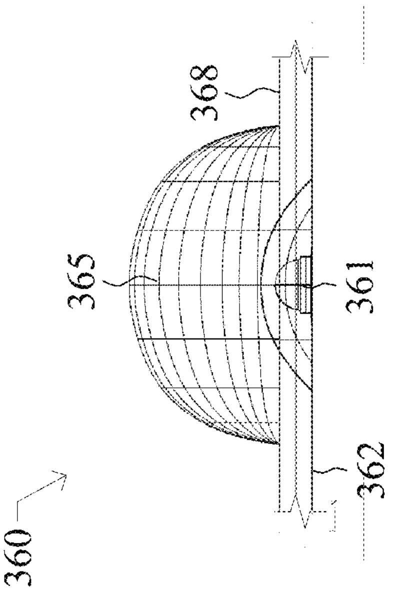
FIG. 7*c* is a view of the optical lens orthogonal to that of FIG. 7*b*.

FIG. 7*c* is an elevation viewed perpendicular to the view in FIG. 7*b* and has a shape that is optimized for glare control in a vicinity of the person 20 (FIG. 1).

Figure 7D:
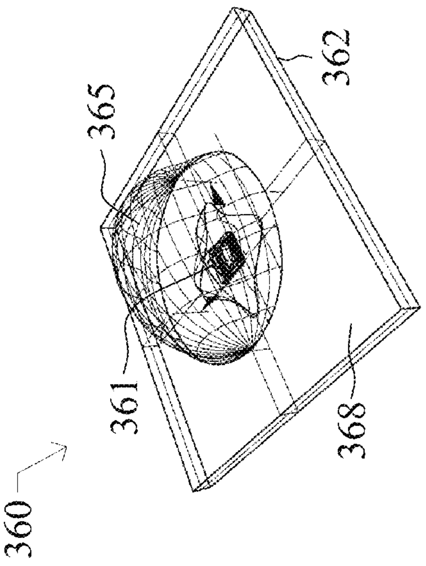
FIG. 7*d* is a perspective view of single optical lens.

FIG. 7*d* is a perspective view of the optical lens with lines showing the contours of the outer periphery of the optical lens structure 365, and the internal contours showing the opening that allows the lens to be placed over the LED 361 shown in the center thereof.

Figure 8B:
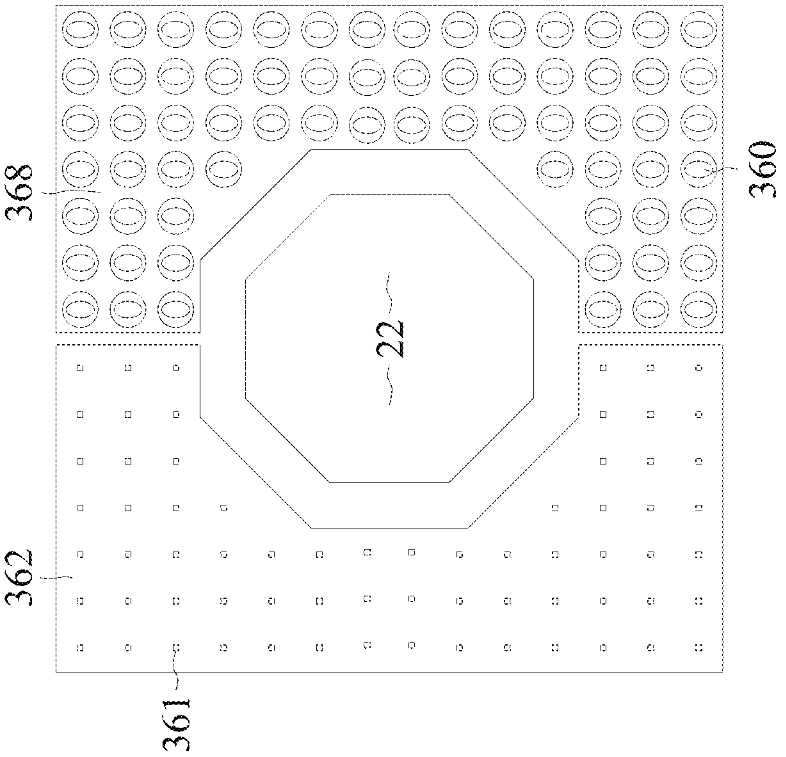
FIG. 8*a* and FIG. 8*b* show an exemplary planar lamp retaining surfaces populated by lamps with lensed optic above a round form and a square form luminaire respectively
Figure 8A:
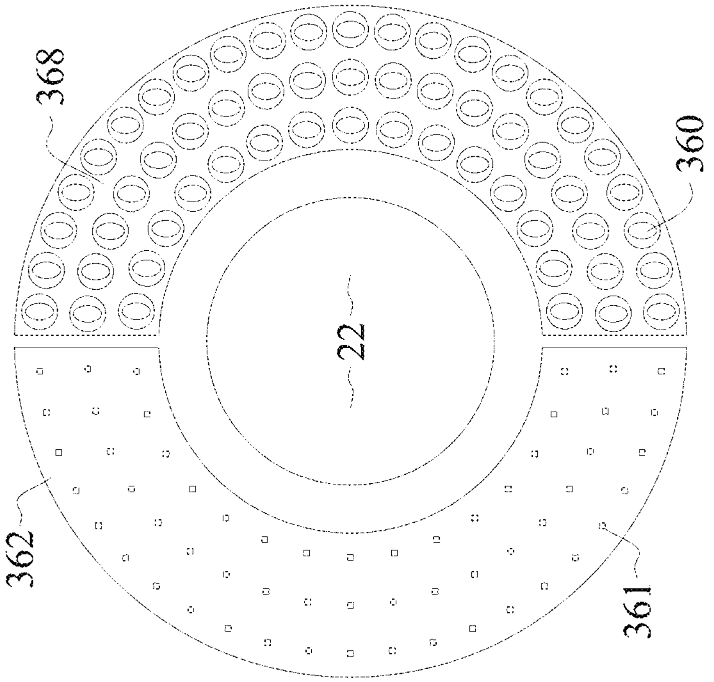

FIGS. 8*a* and 8*b* show an exemplary planar lamp retaining surfaces populated by lamps with lensed optic above a round form and a square form luminaire respectively.

The light source retaining board with lensed optics 24 above, of the orientation specific and/or the non-orientation specific luminaire 5 can take any form. The use of reduced form light source in conjunction with dedicated reduced lens optics is a relatively new optical design approach. This design approach marks a departure from art that relies on a light source retaining board with a lens optical distribution of narrow, medium, and wide light patterns.

The lenses used with the luminaire 5 may be customized for an application while capable of illuminating at least one vertical and horizontal surface/s meeting light levels targeted.

FIG. 8*a* shows two optical lens systems arranged about a central axis of a round opening: the lens system on the left shows LED lamps 361 that are not covered by lenses (although in practice some or all would be covered by lenses), and the lens system on the right is covered by lenses 360 on a lens board structure 368. The lens systems in FIG. 8*a* can couple to two crescent shaped PCBs 15, 362 with LED lamps arranged in correspondence to coupled optical lenses 360. In at least one embodiment, at least one first optical lens 360 can be configured to direct light toward a surface near by the luminaire and at least one second lens is configured to direct light to a remote surface wherein the optical arrangement of the at least one first optical lens 360 differs from the optical design of the at least one second optical lens 360.

The present figure orientation specific lens optical light emittance pattern is pre-configured in relation to at least one horizontal surface and at least one adjacent vertical surface, and a plurality of same design lenses placed over their respective dedicated lamps illuminate the targeted surfaces at the targeted illuminance levels where needed.

FIG. 8*b* shows a single square formed optical lens system that fits over a PCB 15, 362 with a polygonal-shape (e.g., square, rectangular, polygonal, etc.). Similarly to the crescent shaped lensed optics of FIG. 8*a*, the lens shown can be comprised of a plurality of lenses configured to direct the LED light emitted through the lens toward a pre-configured field of illumination below and/or at the side of the luminaire. On the left, the lens board structure 368 and lens 360 are omitted for clarity and to show a spatial correspondence to the lamps 361 and the lenses 360.

The present figure orientation specific lens optical light emittance pattern is pre-configured in relation to at least one horizontal surface and at least one adjacent vertical surface, and a plurality of same design lenses placed over their respective dedicated lamps illuminate the targeted surfaces at the targeted illuminance levels where needed.

Figure 9B:
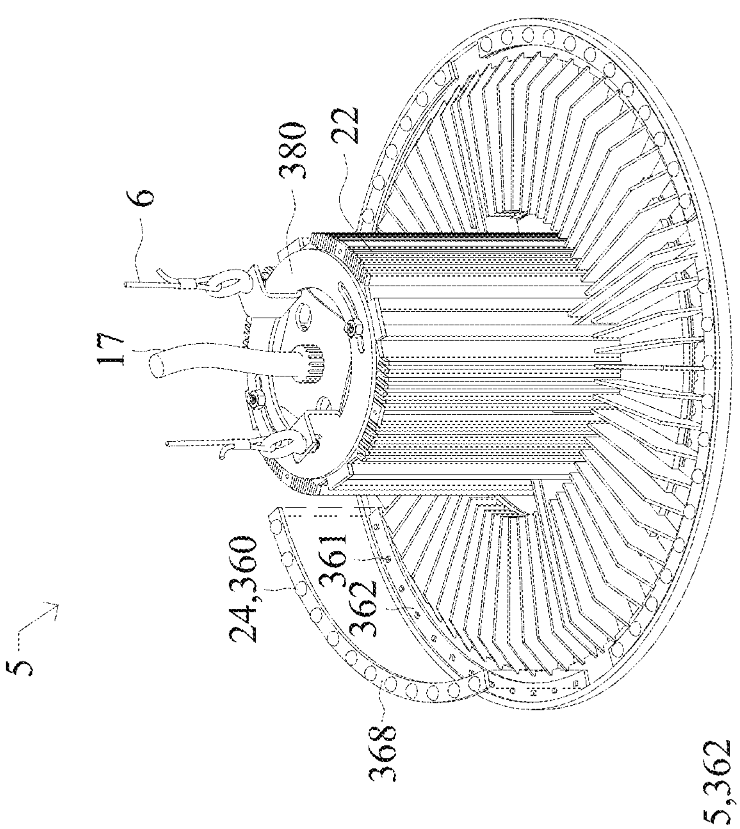
FIG. 9*a* and FIG. 9*b* show respective bottom perspective and top perspective views of an exemplary luminaire with optical lenses coupled to the luminaire's floor facing and ceiling facing surfaces.
Figure 9A:
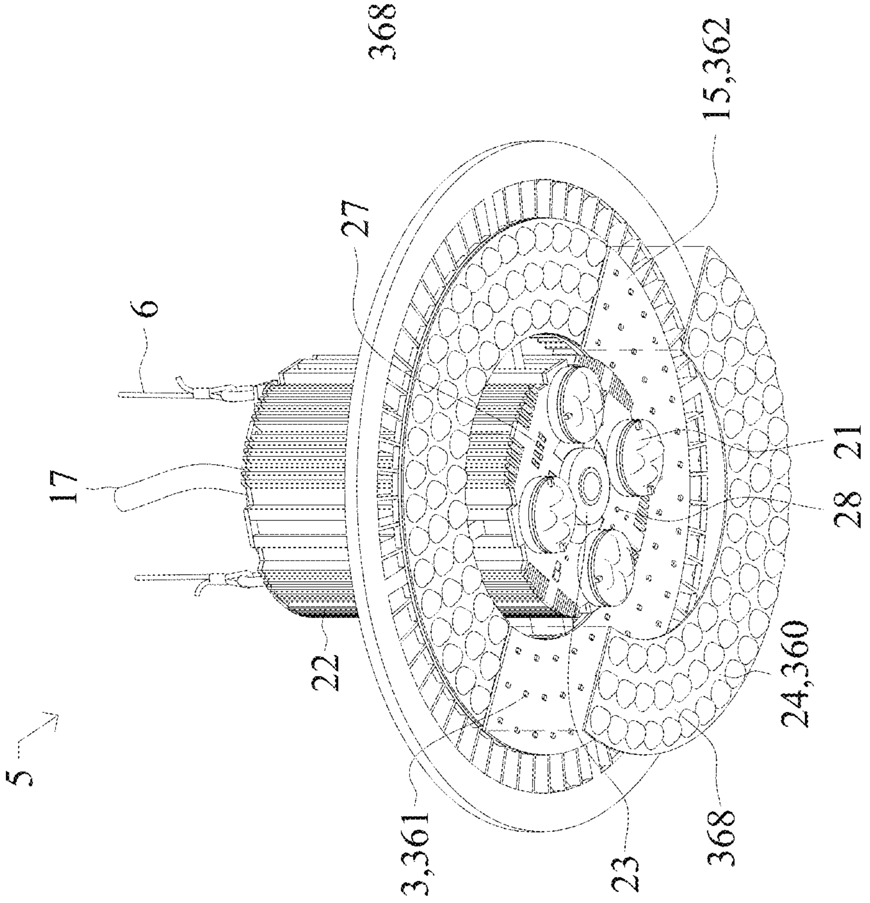

FIGS. 9*a* and 9*b* show bottom perspective and top perspective views of an exemplary luminaire with optical lenses coupled to the luminaire's floor facing and ceiling facing surfaces respectively.

FIG. 9*a* shows a worm eye perspective view of a round form orientation specific luminaire coupled to orientation specific lensed optics. A dedicated lensed optics 24, 360 is shown for each light source 3, 360. In another embodiment a lensed optics 24, 360 can be placed over a plurality of light sources 3, 360 (not shown). Further, a plurality of light sources 3, 360 can couple the PCB 15, 360 of at least one of different, size, watt input, color rendition, and chromaticity (not shown).

The light sources 3, 361 coupled to the PCB 15,362 can be energized by at least one circuit (not shown). The plurality of circuits can control the light emitted by an individual PCB 15, 362 or individual lights on the PCB 15, 362. For example, during off hours, LEDs that emit UV light can decontaminate a space. The PCB 15, 362 with its coupled light sources 3, 361 and lensed optics can be detachable and replaceable by different lensed optics 24, 360 as needed.

FIG. 9*a* also shows the luminaire 5 with an electronic device housing 22, a cable/chain 6, an emergency egress light source 21, switches 27, an indicator light 28, and an IOT device (with a processor and memory, and optional a transceiver) as an occupancy sensor/camera 23.

FIG. 9*b* shows a top-down perspective view of the round form orientation specific luminaire 5 coupled to ceiling facing lensed optics 368. The up-light component of the luminaire 5 can be used with the orientation specific luminaire and the non-orientation specific luminaire. A wide-angle lensed optic 24, 360 placed on the lamps 3, 361 can uniformly illuminate a ceiling above.

The present embodiment shows at least two lamps 3, 361 covered by the lensed optics 24, 360 at opposite side of the luminaire 5 structure. Having the lamps 3, 361 positioned above and away from the electronic device housing 22 of the luminaire 5 eliminates the risk of shadowing a portion of the ceiling. Further, placing the up-light lamps 3, 361 at the luminaire's 5 outer perimeter having a through air gap between these up-light lamps 5 and the downlight directed lamp 5 light helps cool the lamps 5 during operation.

FIG. 9*b* shows the top surface of the orientation specific luminaire 5 coupled to a rotational orientation hub 380. The luminaire 5 rotates about its central vertical axis, secured to the mounting rotational hub 380, to optimally illuminate at least one of, a vertical surface and a horizontal surface within the elongated space.

Other elements shown coupled to the luminaire 5 include a mounting cable/chain 6, a power and/or data conductor 17, and the luminaire's electronic device housing 22.

Figure 10:
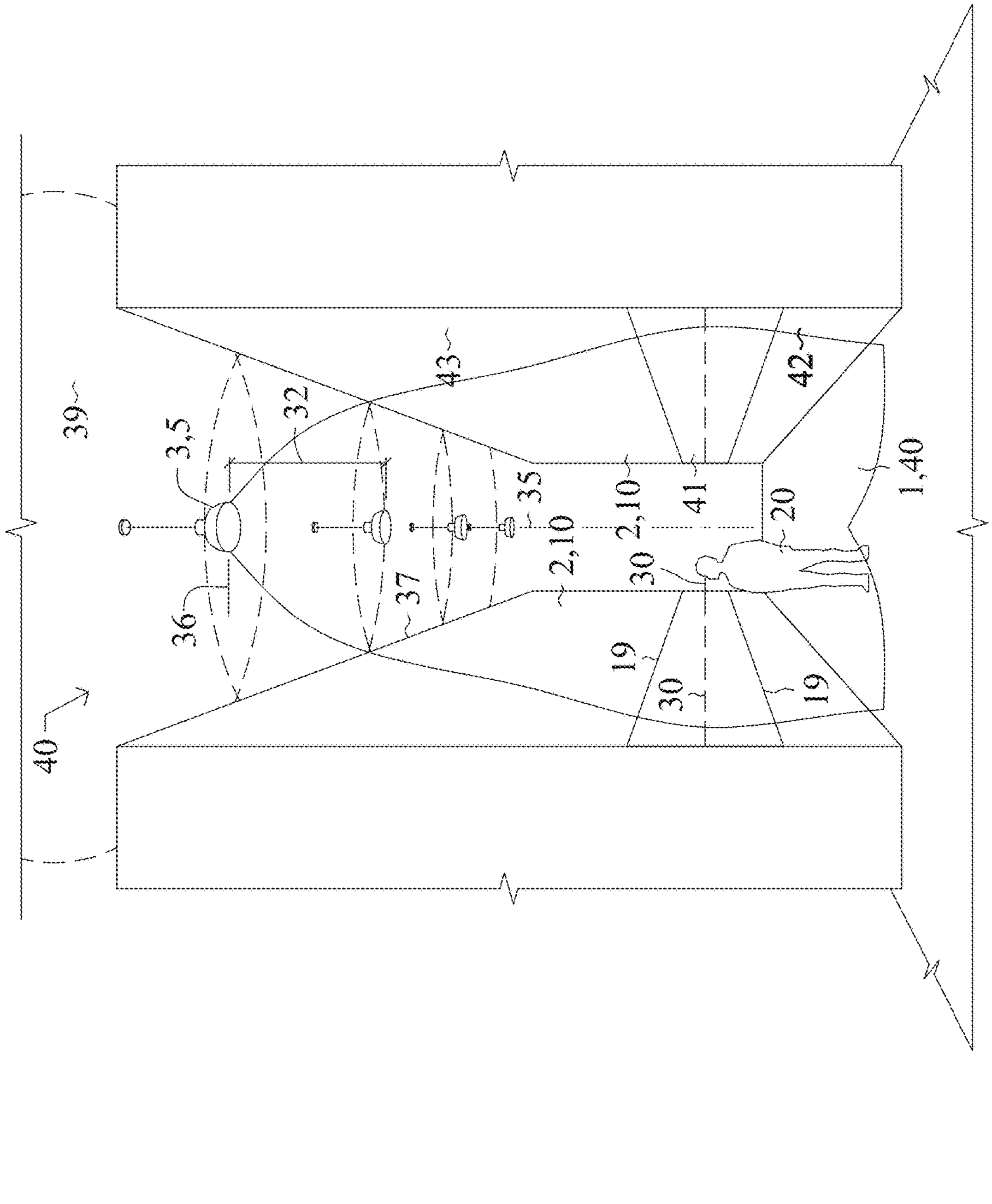
FIG. 10 shows a perspective of an aisle defined by a floor, two first vertical surfaces, a ceiling with luminaires suspended from above, and an adult human figure traversing the aisle.

FIG. 10 shows a perspective of an aisle defined by a floor, two first vertical surfaces, a ceiling with luminaires suspended from above and an adult human figure traversing the aisle. FIG. 10 illustrates an embodiment of several optical light control concepts that could only be attained through the electromechanical and optical solutions of the present innovation.

The elongated space shown in the present figure is a racked aisle 10. Buildings with racked aisles 10 are common to supermarkets, retail big box stores, manufacturing, and warehouse distribution spaces.

While buildings with racked aisles 10 can vary by aisle width 31, rack height 37 and different user types, they all have a common denominator—the highest light level needed by all users across the vertical surface of a rack, the first surface 2, is in proximity to an adult human eye level 30. An adult human eye level 30 in the western hemisphere is about 5'-0" above finished floor 1.

FIG. 10 shows above the floor 1, a plurality of orientation specific luminaires 5 suspended from a ceiling surface 39 above and positioned at approximately the center of the aisle 10. Dashed lined circles shown drawn above and around the luminaires 5 represent light emitted by each of the luminaires 5 toward a surface above 39. In most buildings, the surface above 39 suspended luminaires 5 is substantially horizontal. It is noted that the circles are configured to overlap. to maintain acceptable illumination uniformity across the plane of the ceiling surface 39.

FIG. 10 shows the down light ambient lighting component of the orientation specific luminaire 5 by a thicker line pattern emanating from the luminaire downwardly toward the floor 1. A person trained in the art will refer to the luminaire 5 light emittance pattern as the polar curve. The curve reflects the light emitted dispersion pattern. FIG. 10's light emittance pattern shows the light exiting the luminaire in downward and sideward directions.

The orientation specific luminaire's 5 novel lensed optics 24 disposed over the coupled downward facing light source 3 is configured to emit the luminaire's 5 light from nadir 35 down and sideways toward the first vertical surface 2 in an asymmetrical pattern. The asymmetrical emitted light elongated dispersion pattern direction is parallel to at least the first vertical surface 2 adjacent to the aisle the orientation specific luminaire 5 is suspended next to above.

The polar curve of the present figure also shows that the most intense light emitted falls over the racked first vertical surface 2 approximately at an adult person's 20 eye level 30. This polar curve is in contrast with the intensity light level distribution graphs of present-day art shown in FIGS. 1*a* and 1*b*. It is noted that the art of present day low and high bay luminaires shows the most intense light being emitted well above the height of an adult human 20 eye level 30.

FIG. 10 shows two first vertical surfaces 2 at opposite sides of the aisle's floor 1. Each of the first vertical surfaces 2 shows three subfields of illumination 8 stacked on one another. These subfields are referred to herein as the bottom range subfield 42, the inclusionary range subfield 41, and the top range subfield 43. The adult human 20 eye 30 has a cone of vision of approximately 60° from the horizontal −30° up and 30° down. For example, a person standing at a longitudinal central axis of a 10'-0" wide aisle looking at the first vertical surface 2 cone of vision covers a radius of 3'-9".

FIG. 10 shows the vertical center of an inclusionary range 41 of a first vertical surface 2 configured to align with an adult human 20 eye level 30. It is noted that the highest light intensity over a first vertical surface 2 is over the inclusionary range subfield 41 where most light is needed. The high light intensity level of the inclusionary range subfield 41 is followed by lesser emittance intensity levels over the bottom range subfield 42, and then followed by yet a lesser emittance intensity level over the surface of the top range subfield 43. It is further noted that while anchored about an adult human 20 eye level 30, the height of the inclusionary range subfield 41 top and/or bottom boundaries can vary.

The inclusionary range 41 is bound by top and bottom boundaries. The inclusionary range 41 bottom boundary is also the top boundary of the bottom range subfield 42. The bottom range subfield 42 extends from the inclusionary range 41 bottom boundary to the floor 1 below. The top range 43 extends from the top boundary of the inclusionary range 41 to the top of the first vertical surface 2. In at least one embodiment the number of ranges can vary; however all first vertical surface 2 configurations including lensed optics 24 tasked with illuminating an inclusionary range subfield 41 must have at least two subfield ranges.

Across the transverse direction of the racked aisle's 10 floor 1, the light emitted intensity by the orientation specific luminaire 5 is reduced at the aisle's center. The optical lens 24 of the orientation specific luminaire 5 can be configured to use the floor 1 surface as a reflective surface to enhance the light levels over the bottom range subfield 42 of the first vertical surface 2. The luminaire's 5 downwardly directed light falling on the floor 1 can be redirected toward the bottom range subfield 42.

The present electromechanical and optical innovation provides the means to control the light intensity over subfields surfaces 41, 42, 43 where the light is needed, maintains excellent uniformity ratios within vertical and horizontal surfaces' subfields, minimize or significantly reduce glare, and maintains balanced illumination ratios among the elongated space surfaces' subfields.

The present application teaches and shows a means to perfect complex illumination design that considers at least one of, surfaces' reflectance values, location of surfaces to be illuminated in relation to at least one light source, relation between one illuminated surface and another, glare mitigation, use of unique lensed optics over a plurality of light sources, and meeting target light levels over a plurality of surfaces by following the illumination ratios prescribed.

Figure 11:
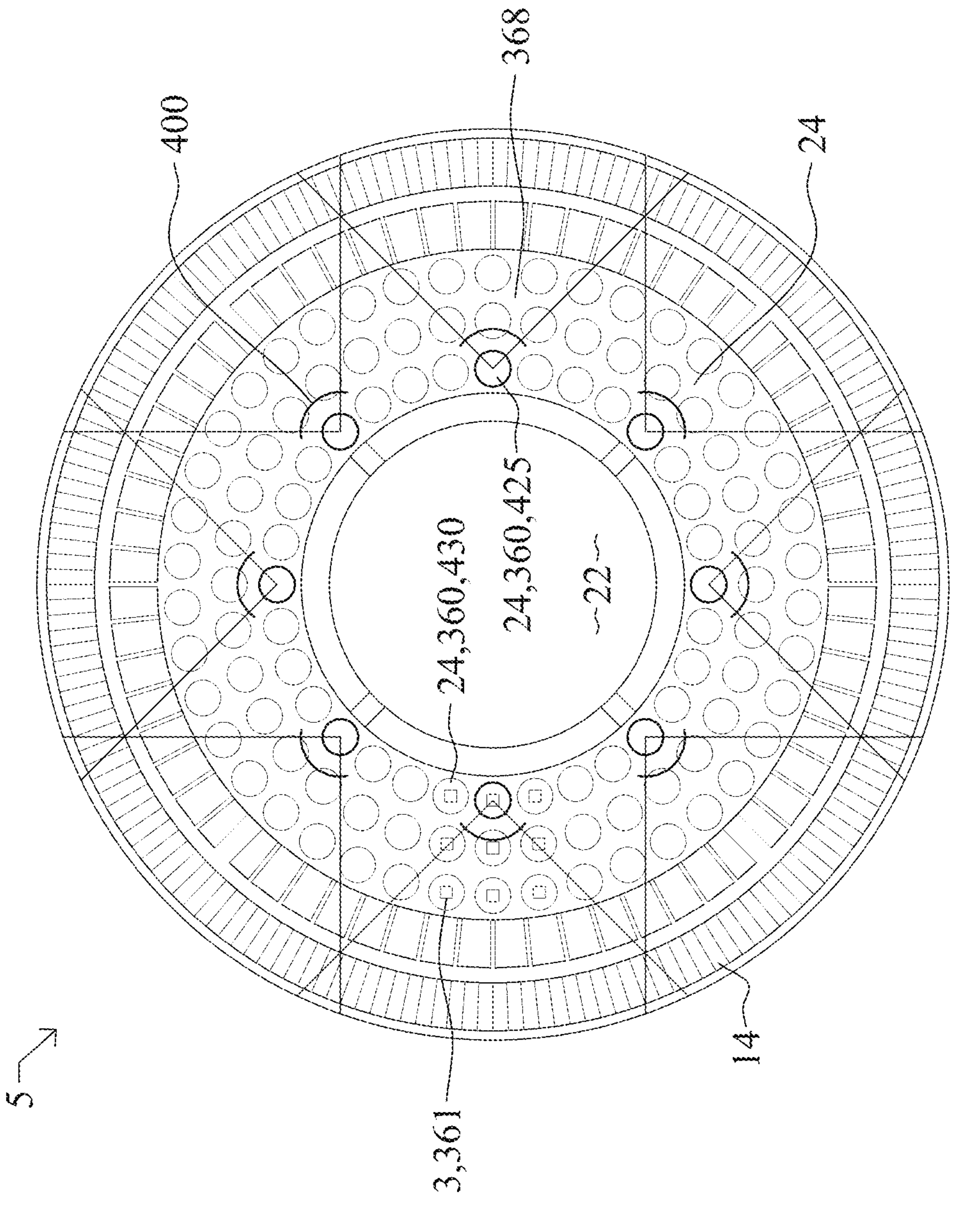
FIG. 11 shows a bottom view of the orientation specific luminaire.

FIG. 11 shows a bottom view of the orientation specific luminaire 5. Elements of the luminaire 5 shown from the center of the embodiment outwardly include, at the center an electronic device housing 22, a plurality of domed lenses 360, and a refractor 14 at the luminaire's exterior perimeter. The plurality of domed lenses 360 include at least two types of lensed optics 24 purposed to primarily direct lamp 3, 361 light emitted through in different directions from one another.

The domed lens types can appear similar to one another while coupled to the same lens board structure 368, and fulfill different illumination tasks. A domed lens 430 is configured to direct the lamp 361 light emitted downwardly. A domed lens 425 is configured to direct the lamp 361 light emitted sideways.

The domed lens 425 horizontal light spread angle 400 can be configured to illuminate a portion of the inner surface of the refractor 14, wherein another neighboring domed lens 425 horizontal light spread angle 400 can overlap with its light emittance to establish uniform levels of illuminance across the exterior surface of the refractor 14.

A domed lens 425 tasked with illuminating at least one refractor can be seated distally away from the refractor to enable maximum horizontal beam spread angle width for broad illumination coverage. With any one luminaire 5, the number of downward light directing optical domed lenses 430 is greater than the number of sideways light directing optical domed lenses 425.

Figure 12B:
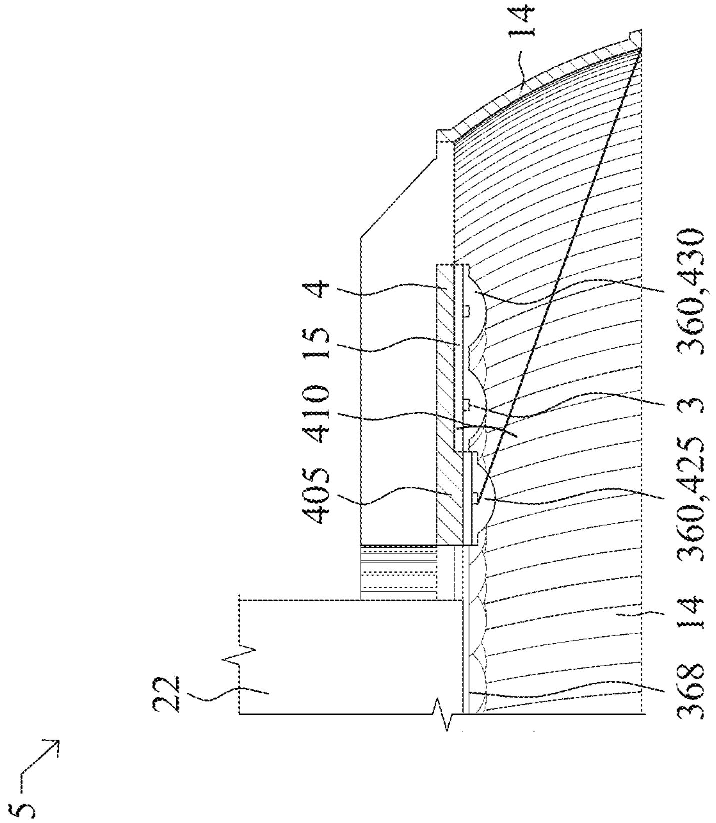
FIG. 12*a* and FIG. 12*b* show a partial vertical section of a luminaire with a reflector.
Figure 12A:
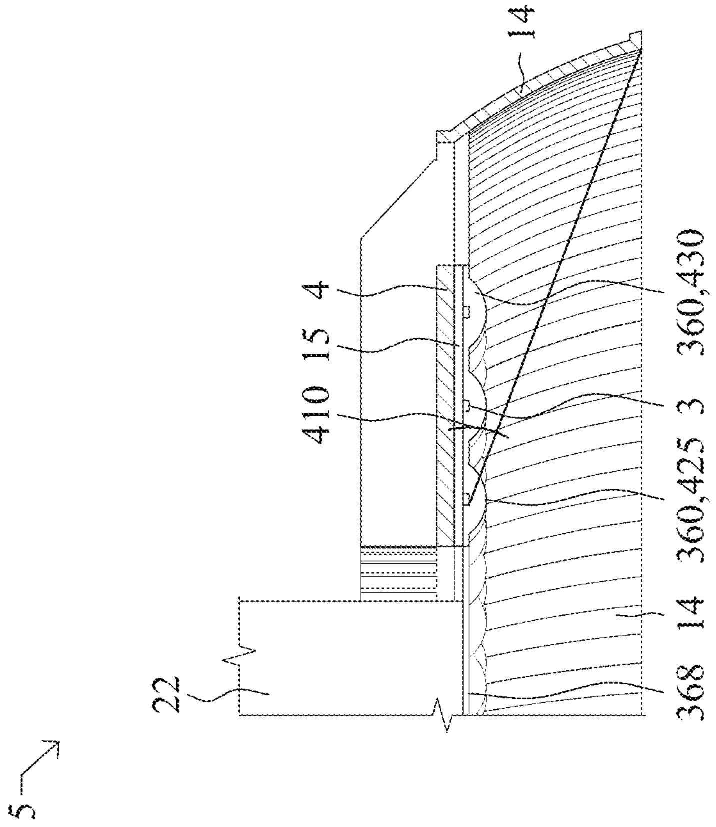

FIGS. 12*a* and 12*b* show partial vertical sections of a luminaire with a reflector. FIG. 12*a* shows a single planar surface retaining a PCB board with light source. FIG. 12*a* shows at least two planar surfaces retaining PCB boards with light sources.

FIG. 12*a* shows a partial vertical section of an electronic device housing 22 that is coupled to a heatsink 4. A planar PCB 15 shown coupled from below to the heatsink 4, retaining a plurality of light sources 3. The light sources are covered by a lens board structure 368 that comprises at least two types of domed optical lenses 360.

The two types of domed optical lenses 360 can include at least one of a downward light emitting domed optics 430 and a sideways light emitting domed optics 425. The downward light emitting domed optics 430 is configured to emit light downward onto at least one of a horizontal surface and a vertical surface. The domed optics lens 430 can be positioned away from the electronic device housing 22 as it is tasked with emitting light downwardly.

A domed optics 425 lens is tasked with emitting sideways light toward a refractor 14. The domed optics 425 lens can be positioned toward the axial vertical center of the luminaire. The present embodiment shows the domed lens 425 in proximity to the bottom surface of the electronic device housing 22. The placement of the domed lens optics at the shown position enables spreading the horizontal light beam spread angle wider, thus reducing the count of domed lenses 425 around the present embodiment's electronic device housing. As shown, light beam spread angle 410 can be configured to precisely illuminate the inner surface of refractor 14 with little or no stray light emitted below the bottom surface of the refractor 14.

FIG. 12*b* shows the same elements as those shown in FIG. 12*a*, except for element 405 the elevated heatsink seat. The elevated heatsink seat 405 is configured to elevate at least one PCB 15 with a coupled light source 3 covered by a sideways light emitting domed optics 425 above at least one downward light emitting domed optics 430. Elevating the light source provides better light coverage across the inner surface of the refractor 14.

The elevated heatsink seat 405 shown can be a monolithic extension of the heatsink 4 as shown in the present embodiment, an add-on surface, or a stand-alone surface. The elevated heatsink seat surface can be configured to extend below the surface of the heatsink surface 4 for the benefit of a single sideways light emitting domed optics lens 425 or a plurality of such lenses. In at least one embodiment, the elevated heat sink seat 405 can also seat at least one downward light emitting domed optical lens 430 and/or can extend the length of the downward facing surface of the heatsink in proximity to the vertical central axis of the luminaire.

Regardless of the means to illuminate the refractor, the combined unified glare rating (UGR) value of the luminaire's 5 downward and sideways directed light is equal to or less than 20 UGR.

FIGS. 13*a*, 13*b*, 13*c*, and 13*d* show partial bottom views of a luminaire with a refractor. Each of the four figures shows a different optomechanical arrangement for illuminating the refractor.

Figure 13D:
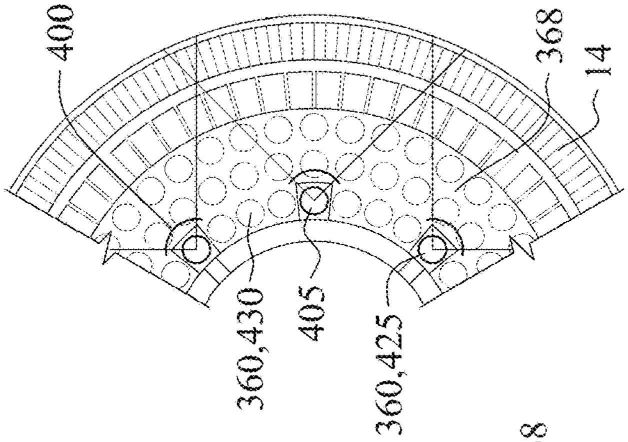
FIG. 13*a*, FIG. 13*b*, FIG. 13*c*, and FIG. 13*d* show partial bottom views of a luminaire with a refractor. Each of these four figures shows a different optomechanical arrangement for illuminating the refractor.
Figure 13C:
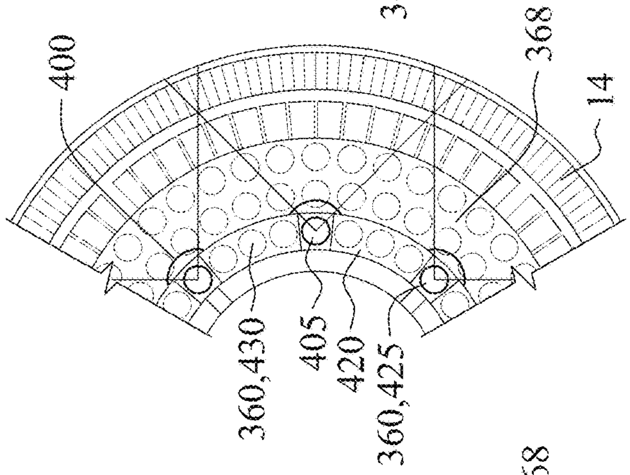
Figure 13B:
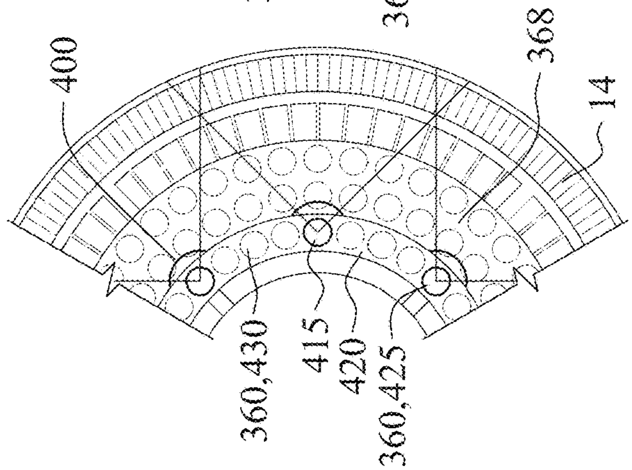
Figure 13A:
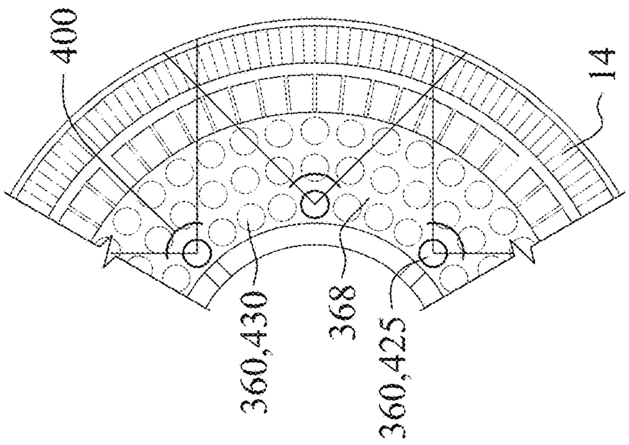

FIG. 13*a* shows a section of a lensed board structure 368 with two types of domed lensed optics 360. Downward light emitting domed lensed optics 430 shown is configured to direct light downward toward a surface below or downward toward a surface below and at least one vertical surface.

Sideways light emitting domed lensed optics 425 shown is configured to direct light toward the inner surface of the refractor 14. A horizontal light beam spread angle 400 shows an overlapped emission pattern among a plurality of the sideways light emitting domed lensed optics 425.

The planar lensed board structure is configured to be placed over a plurality of light sources with corresponding domed optical lenses 360. The light sources can vary from one another by at least one of, dimension, color temperature, color saturation, and light output. It is noted that the light source below a downward light emitting domed lensed optics 430 can be different than the light source below a sideways light emitting domed lensed optics 425.

FIG. 13*b* shares the same attributes as FIG. 13*a* except for a distinct separation between the lensed board 368 and the optical crescent lensed board 420. FIG. 13*b* shows the crescent lensed board 368 comprising downward light emitting domed lensed optics 430 and sideways light emitting domed lensed optics 425 coupled to the optical crescent shaped board. The crescent shaped lensed board 420 can be co-planar with the lensed board 368 or can be elevated.

FIG. 13*c* shares the same attributes as FIG. 13*b* except for a separation in the optical crescent lensed board 420 wherein the sideways light emitting domed lensed optics rests on an elevated heatsink seat 405. The seat 405 can protrude downwardly below the seat of the optical crescent lensed board 420.

FIG. 13*d* shares the same attributes as FIG. 13*a* except the crescent lensed board with domed optics 368 covers only downward light emitting lensed optics 430 light sources. The sideways light emitting lensed optics 425 are shown resting on the heatsink seat's 405 raised surface/s.

It is noted that in at least one different arrangement, the sideways light emitting domed lensed optics 425 can be placed in proximity to the refractor 14 (not shown). To maintain good light uniformity across the exterior surface of the refractor 14, a greater quantity of sideways emitting domed lensed optics 425 can be required. For this reason, the preferred sideways emitting optical arrangement placement is in proximity to the vertical central axis of the round luminaire.

In yet a different optomechanical arrangement, a segmented or round reflective surface (not shown) located toward the vertical central axis of the luminaire can extend downward to capture and re-direct light emitted by the light source toward the inner surface of the refractor 14. The reflective surface can extend below the lensed board structure 368 and can be configured to re-direct the substantial portion of the light captured toward the inner surface of the refractor, mitigating glare.

Furthermore, in at least one different embodiment, any of the optomechanical arrangements described above, alone or in conjunction with one another, can be used with at least one of an egress light source that is coupled to a luminaire from below and a light source that directs light in the opposite direction to the downward directed light source.

ELEMENT LIST

1. Horizontal Aisle Surface/Floor
2. First Vertical Surface/Rack Face
3. Light Source/Lamp
4. Heat Sink
5. Orientation Specific Luminaire
6. Cable/Chain
7. Support Structure
8. Array Target/Subfield of Illumination
9. Mechanical Orientation Mounting Device
10. Racked Aisle
11. Extender Arm
12. Rotational Disk
13. Alignment Mechanical Device Flange
14. Reflector/Refractor
15. PCB
16. Light Ray
17. Power and/or Data Conductor
18. Alignment Bolt
19. Boundaries of inclusive range
20. Adult Human
21. Emergency Egress Light Source
22. Electronic Device Housing
23. O. Sensor/Camera, transceiver
24. Lensed Optics/Optical lens board
25. Vertical Surface Height

27. Switch
28. Indicator Light
30. Adult Human Eye Level
31. Aisle Width
32. Luminaire Spacing
33. Luminaire Spacing Mid-point
35. Nadir
36. Luminaire Mounting Height
40. Elongated Space
41. Inclusionary Range Subfield
42. Bottom Range Subfield
43. Top Range Subfield
300. Polar Curve Diagram
310. Vertical Polar Curve
320. Horizontal Polar Curve
330. 3D Wire Frame
331. Floor directed Luminosity
332. Side directed Luminosity
341. Side Directed Beam Profile
342. Bottom directed Beam Profile
345. Light Source Position
350. Cross Emittance pattern
351. Longitudinal Emittance Pattern
360. Domed Lens
361. Lamp
362. Lamp Retaining Surface
365. Lens/Lens Structure
368. Lens Board Structure
380. Rotational Mounting Hub
400. Horizontal Light Beam Spread Angle
405. Elevated Heatsink Seat
410. Vertical Light Beam Spread Angle
415. Elevated Heatsink Seat Crescent
420. Crescent Optical Lens Board
425. Sideways Light Emitting Domed Lensed Optics
430. Downward Light Emitting Domed Lensed Optics Obviously, numerous modifications and variations of the present disclosure are possible in light of the above teachings. It is therefore to be understood that within the scope of the appended claims, the disclosure may be practiced otherwise than as specifically described herein.

The invention claimed is:

1. An orientation specific luminaire for illuminating a space from above an aisle, the orientation specific luminaire comprising:

a housing that supports a light source, the housing including a downward facing side that faces a floor of the aisle, and has a predetermined orientation set in relation to at least one of a longitudinal axis of the aisle and a first vertical surface that defines a first side of the aisle;

the light source, the light source being supported by the downward facing side of the housing, the light source including a plurality of lamps distributed across a planar structure, a lensed board with domed optics including at least two types of directional lens optics, the lensed board with domed optics is disposed over the plurality of lamps, and a refractor that is coupled to an exterior side of the planar structure and extends below the plurality of lamps, wherein a first type of the at least two types of directional lens optics directs light emitted from the plurality of light sources downwardly to illuminate a plurality of vertical illuminated subfields distributed along a first vertical surface and across a plurality of horizontal illuminated subfields distributed along a floor of the aisle, a second type of the at least two types of directional lens optics directs light sideways to illuminate an inner face of the refractor, and a beam spread of light emitted sideways by the second type of the at least two types of directional lens optics overlaps with an adjacent beam spread to provide a uniform illuminance across a surface of the refractor.

2. The orientation specific luminaire of claim 1, wherein beam spread of light emitted sideways by the second type of the at least two types of directional lens optics illuminates the inner face of the refractor.

3. The orientation specific luminaire of claim 1, wherein the plurality of lamps includes at least one lamp with a downward lensed domed optics cover that is different than another lamp of the plurality of lamps that has a sideways domed lensed optics cover.

4. The orientation specific luminaire of claim 1, wherein at least one sideways light emitting lens optics is disposed below at least one domed lens coupled to the lensed board.

5. The orientation specific luminaire of claim 1, wherein an elevation of a surface that retains a lamp, of the plurality of lamps, with a sideways emitting lensed optics above is different than an elevation of another lamp, of the plurality of lamps, with a downward emitting lensed optics above.

6. The orientation specific luminaire of claim 1, wherein a directional lensed optics that illuminates a path of egress is coupled to a bottom surface of the orientation specific luminaire.

7. The orientation specific luminaire of claim 1, wherein lensed optics configured to direct light to illuminate a surface above the orientation specific luminaire is coupled to the orientation specific luminaire.

8. An orientation specific luminaire for illuminating a space from above an aisle, the orientation specific luminaire comprising:

a housing that supports a light source, the housing including a downward facing side that faces a floor of the aisle, and has a predetermined orientation set in relation to at least one of a longitudinal axis of the aisle and a first vertical surface that defines a first side of the aisle;

the light source, the light source being supported by the downward facing side of the housing, the first light source including a plurality of lamps distributed across a portion of a planar structure, a lensed board with domed optics including at least two types of directional lens optics, the lensed board with domed optics is disposed over the plurality of lamps, and a refractor that is coupled to an exterior side of the planar structure and extends below the plurality of lamps, wherein a first type of the at least two types of directional lens optics directs light emitted from the plurality of light sources downwardly to illuminate a plurality of vertical illuminated subfields distributed along a first vertical surface and across a plurality of horizontal illuminated subfields distributed along a floor of the aisle, a second type of the at least two types of directional lens optics directs light sideways to illuminate an inner face of the refractor, and a vertical light beam spread angle of the second type of the at least two types of directional lens optics illuminates the inner surface of the refractor.

9. The orientation specific luminaire of claim 8, wherein the second type of the at least two types of directional lens optics is seated distally away from the refractor to enable maximum horizontal beam spread angle width for broad illumination coverage.

10. The orientation specific luminaire of claim 8, wherein a number of downward light directing optical domed lenses is greater than a number of sideways light directing optical domed lenses.

11. The orientation specific luminaire of claim 8, wherein the vertical light beam spread angle is set to illuminate a section of the inner surface of the refractor.

12. The orientation specific luminaire of claim 8, wherein a combined UGR value of the downward directed light and sideways directed light is equal to or less than 20 UGR.

13. The orientation specific luminaire of claim 8, wherein a directional lensed optics for illuminating a path of egress is coupled to a bottom surface of the orientation specific luminaire.

14. The orientation specific luminaire of claim 8, wherein a lensed optics for illuminating a surface above the orientation specific luminaire is coupled to the orientation specific luminaire.

15. An orientation specific luminaire for illuminating a space from above an aisle, the orientation specific luminaire comprising:

a housing that supports a light source, the housing including a downward facing side that faces a floor of the aisle, and has a predetermined orientation set in relation to at least one of a longitudinal axis of the aisle and a first vertical surface that defines a first side of the aisle;

the light source, the light source being supported by the downward facing side of the housing, the light source including a plurality of lamps distributed across a planar structure, a lensed board with domed optics including at least two types of directional lens optics, the lensed board with domed optics is disposed over the plurality of lamps, and a refractor that is coupled to an exterior side of the planar structure and extends below the plurality of lamps, wherein a first type of the at least two types of directional lens optics directs light emitted from the plurality of light sources downwardly to illuminate a plurality of vertical illuminated subfields distributed along a first vertical surface and across a plurality of horizontal illuminated subfields distributed along a floor of the aisle, a second type of the at least two types of directional lens optics directs light sideways to illuminate an inner face of the refractor, and the second type of lens optics is positioned below a bottom surface of the lensed board that retains a substantial majority of the first type of the at least two types of directional lens optics.

16. The orientation specific luminaire of claim 15, wherein a number of downward light directing optical domed lenses is greater than a number of sideways light directing optical domed lenses.

17. The orientation specific luminaire of claim 15, wherein the vertical light beam spread angle is set to illuminate the inner surface of the refractor.

18. The orientation specific luminaire of claim 15, wherein at least one lamp with a downward lensed optics cover above is different than at least one lamp with a sideway lensed optics cover above.

19. The orientation specific luminaire of claim 15, wherein a combined UGR value of the downward directed light and sideways directed light is equal to or less than 20 UGR.

20. The orientation specific luminaire of claim 15, wherein a directional lensed optics for illuminating a path of egress is coupled to a bottom surface of the orientation specific luminaire.

21. The orientation specific luminaire of claim 15, wherein a lensed optics for illuminating a surface above the orientation specific luminaire is coupled to the orientation specific luminaire.

22. The orientation specific luminaire of claim 15, wherein UV light directed toward the inner wall of the refractor excites a laced/painted medium to glow with light in a wavelength visible to humans.

23. The orientation specific luminaire of claim 22, wherein the light having the wavelength visible to humans is visible across an outer wall surface of the refractor.

* * * * *